United States Patent
Song

(10) Patent No.: US 9,846,736 B2
(45) Date of Patent: Dec. 19, 2017

(54) DATA PROCESSING METHOD, DATA PROCESSING DEVICE, DATA COLLECTING METHOD AND INFORMATION PROVIDING METHOD

(75) Inventor: Ha Yoon Song, Seoul (KR)

(73) Assignees: SANGSU-DONG, HONGIK UNIVERSITY, Seoul (KR); HONGIK UNIVERSITY INDUSTRY-ACADEMIA COOPERATION FOUNDATION, Seoul (KR)

( * ) Notice: Subject to any disclaimer, the term of this patent is extended or adjusted under 35 U.S.C. 154(b) by 625 days.

(21) Appl. No.: 14/369,585

(22) PCT Filed: Jun. 25, 2012

(86) PCT No.: PCT/KR2012/004997
§ 371 (c)(1),
(2), (4) Date: Nov. 3, 2014

(87) PCT Pub. No.: WO2013/100287
PCT Pub. Date: Jul. 4, 2013

(65) Prior Publication Data
US 2015/0052097 A1   Feb. 19, 2015

(30) Foreign Application Priority Data

Dec. 29, 2011  (KR) .................. 10-2011-0146367
Jun. 7, 2012   (KR) .................. 10-2012-0060839

(51) Int. Cl.
*G06F 9/44*   (2006.01)
*G06N 7/02*   (2006.01)
(Continued)

(52) U.S. Cl.
CPC ..... *G06F 17/30598* (2013.01); *G06N 99/005* (2013.01)

(58) Field of Classification Search
USPC .......................................... 706/52
See application file for complete search history.

(56) References Cited

U.S. PATENT DOCUMENTS

| 9,185,523 | B2* | 11/2015 | Song | .......... | H04W 4/023 |
| 2013/0304685 | A1* | 11/2013 | Kurata | ......... | G01C 21/20 |
| | | | | | 706/45 |

(Continued)

FOREIGN PATENT DOCUMENTS

JP   2011-118776   6/2011
KR   10-2010-0127595   12/2010

OTHER PUBLICATIONS

A batch processing algorithm for target tracking using frequency measurements Brian P. Powell; Michael T. Grabbe; Mark D. LoPresto 2017 IEEE Aerospace Conference Year: 2017 pp. 1-10, DOI: 10.1109/AERO.2017.7943724 IEEE Conference Publications.*

(Continued)

*Primary Examiner* — Michael B Holmes
(74) *Attorney, Agent, or Firm* — Mayer & Williams PC; Stuart H. Mayer

(57) ABSTRACT

Disclosed is a method of predicting user's position. This method comprises, creating information on a plurality of location clusters by processing a plurality of position data for a user with a probability based clustering algorithm; receiving a current position data of the user and determining a first location cluster to which the current data is mapped among the plurality of location clusters; and creating second information related to a probability that the user moves from the first location cluster to a second location cluster among the plurality of location clusters. The position data is a data tuple including latitude, longitude, and time. For all the plurality of location clusters, the information includes a (Continued)

determined representative position value of each of the location clusters.

5 Claims, 24 Drawing Sheets

(51) Int. Cl.
    *G06N 7/06*     (2006.01)
    *G06F 17/30*     (2006.01)
    *G06N 99/00*     (2010.01)

(56) References Cited

U.S. PATENT DOCUMENTS

| | | | | |
|---|---|---|---|---|
| 2014/0143187 A1* | 5/2014 | Song | ............... | G06N 3/084 706/12 |
| 2014/0378160 A1* | 12/2014 | Song | ............... | H04W 4/023 455/456.1 |
| 2015/0087333 A1* | 3/2015 | Song | ............... | G01S 5/0242 455/456.1 |
| 2016/0123728 A1* | 5/2016 | Song | ............... | G01P 3/00 702/142 |

OTHER PUBLICATIONS

Efficacy of Season Prediction for Geo-locations Using Geo-tagged Images Shesha Sreenivasamurthy; Shayna Frank 2015 IEEE International Conference on Information Reuse and Integration Year: 2015 pp. 476-484, DOI: 10.1109/IRI.2015.79 IEEE Conference Publications.*

Finding Important Locations: A Feature-Based Approach Marco Pavan; Stefano Mizzaro; Ivan Scagnetto; Andrea Beggiato 2015 16th IEEE International Conference on Mobile Data Management Year: 2015, vol. 1 pp. 110-115, DOI: 10.1109/MDM.2015.11 IEEE Conference Publications.*

Global and individual mobility pattern discovery based on hotspots Jie Yang; Xinyu Zhang; Yuanyuan Qiao; Zubair Fadlullah; Nei Kato 2015 IEEE International Conference on Communications (ICC) Year: 2015 pp. 5577-5582, DOI: 10.1109/ICC.2015.7249211 IEEE Conference Publications.*

T. Vincenty, "Direct and Inverse Solutions of Geodesics on the ellipsoid with Application of Nested Equations," Survey Review, vol. 23, No. 176, Apr. 1975 , pp. 88-93(6).

Kim et al. "A Use of Expectation Maximization Clustering for Charactiezing the Human Mobility Pattern", Nov. 2011 Department of Computer Engineering, Hongik University, vol. 35, No. 2, pp. 261-264.

* cited by examiner

FIG. 1

| Location | # of Data | Average | Std. Dev. | Maximum | Error Ratio |
|---|---|---|---|---|---|
| GPS-Outside | 1691 | 4.4498 | 7.1695 | 51.7788 | 12.30% |
| GPS-Inside | 2187 | N/A | N/A | 10769.72 | N/A |
| 3GBS-Outside | 332 | 52.6618 | 23.5953 | 206.3526 | 36.75% |
| 3GBS-Inside | 894 | 52.5530 | 32.6859 | 156.7578 | 48.66% |

FIG. 3

| Attributes | Cluster #1 | Cluster #2 |
|---|---|---|
| Center Position | 37.55063433212, 126.924338173 | 37.53103155017, 126.738378099 |
| Std.Dev. of Positions | 0.001421985754, 0.0018165770 | 0.004433808732, 0.0106206104 |
| Init. Max. Distance | 1.2895475083Km | 1.6346787354Km |
| Mean Radius | 0.4230522023Km | 0.8602108048Km |
| Std.Dev. of Radius | 0.1510241812Km | 0.2611918062Km |
| Mean Velocity | 1.7603687520Km/h | 1.7167060110Km/h |
| Stay Time | 192h 41min 51sec | 174h 32min 49sec |
| Stay Time Ratio | 0.48401121 | 0.43842124 |
| # of GPS data | 36068 | 36291 |
| | Cluster #3 | Cluster #4 |
| Center Position | 37.50888469813, 126.745592885 | 37.56163253234, 126.984433796 |
| Std.Dev. of Positions | 0.002622770045, 0.0049952464 | 0.001092322042, 0.0016551943 |
| Init. Max. Distance | 1.0622189806Km | 0.7402234633Km |
| Mean Radius | 0.7908515486Km | 0.8602108048Km |
| Std.Dev. of Radius | 0.2709407549Km | 0.1155222349Km |
| Mean Velocity | 4.4234336044Km/h | 3.7164649020Km/h |
| Stay Time | 1h 23min 59sec | 2h 39min 38sec |
| Stay Time Ratio | 0.00351578 | 0.00668270 |
| # of GPS data | 776 | 369 |
| | Cluster #5 | Cluster #6 |
| Center Position | 37.61160856301, 126.725829209 | 37.50117796238, 127.024098038 |
| Std.Dev. of Positions | 0.001998271866, 0.0011028002 | 0.002822730855, 0.0036000113 |
| Init. Max. Distance | 0.9545632012Km | 0.9845817834Km |
| Mean Radius | 0.4143471803Km | 1.9565636861Km |
| Std.Dev. of Radius | 0.1675891550Km | 0.2085686049Km |
| Mean Velocity | 3.5441394683Km/h | 6.4222173338Km/h |
| Stay Time | 1h 33min 39sec | 2h25min 49sec |
| Stay Time Ratio | 0.00392045 | 0.00610429 |
| # of GPS data | 674 | 474 |

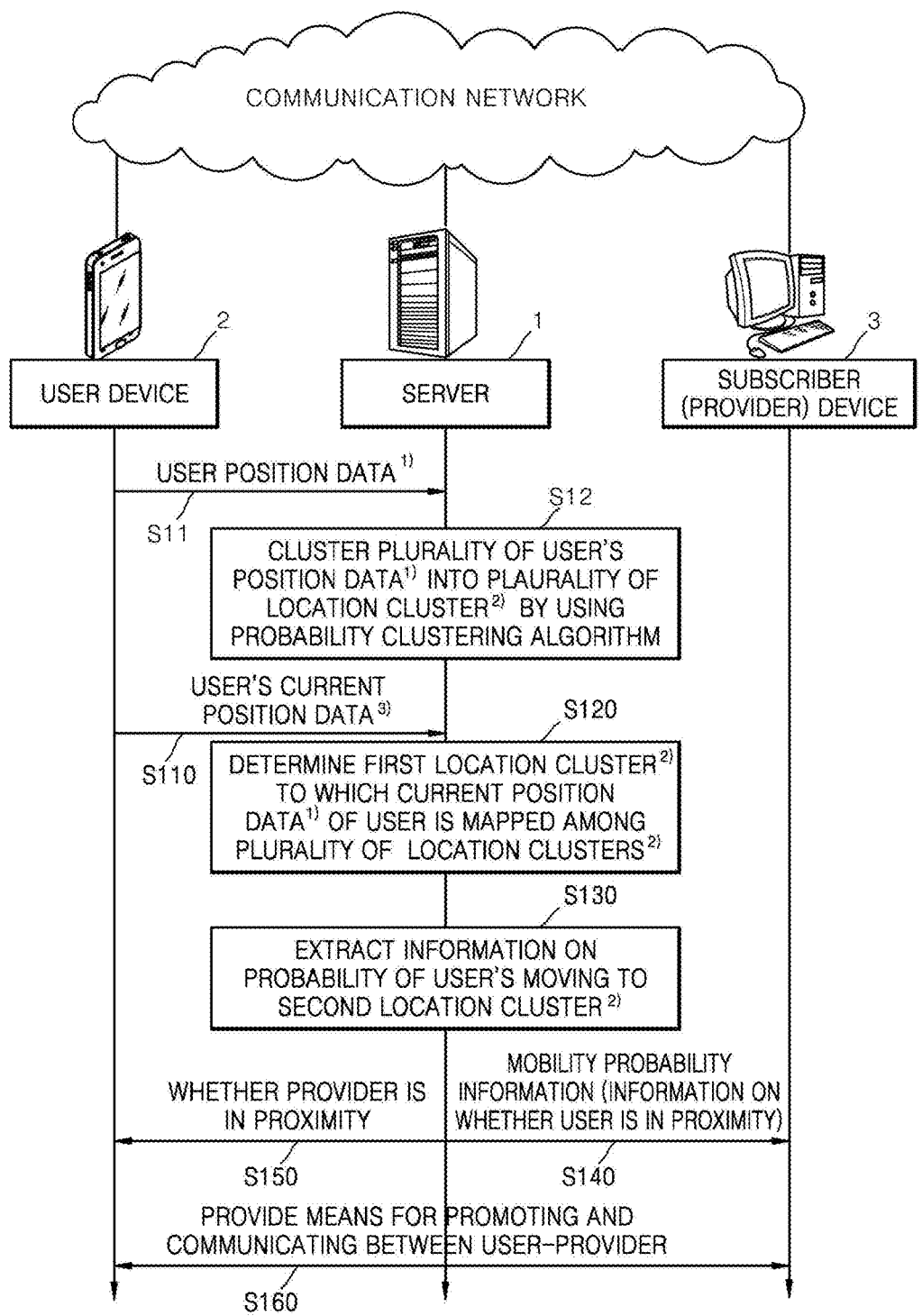

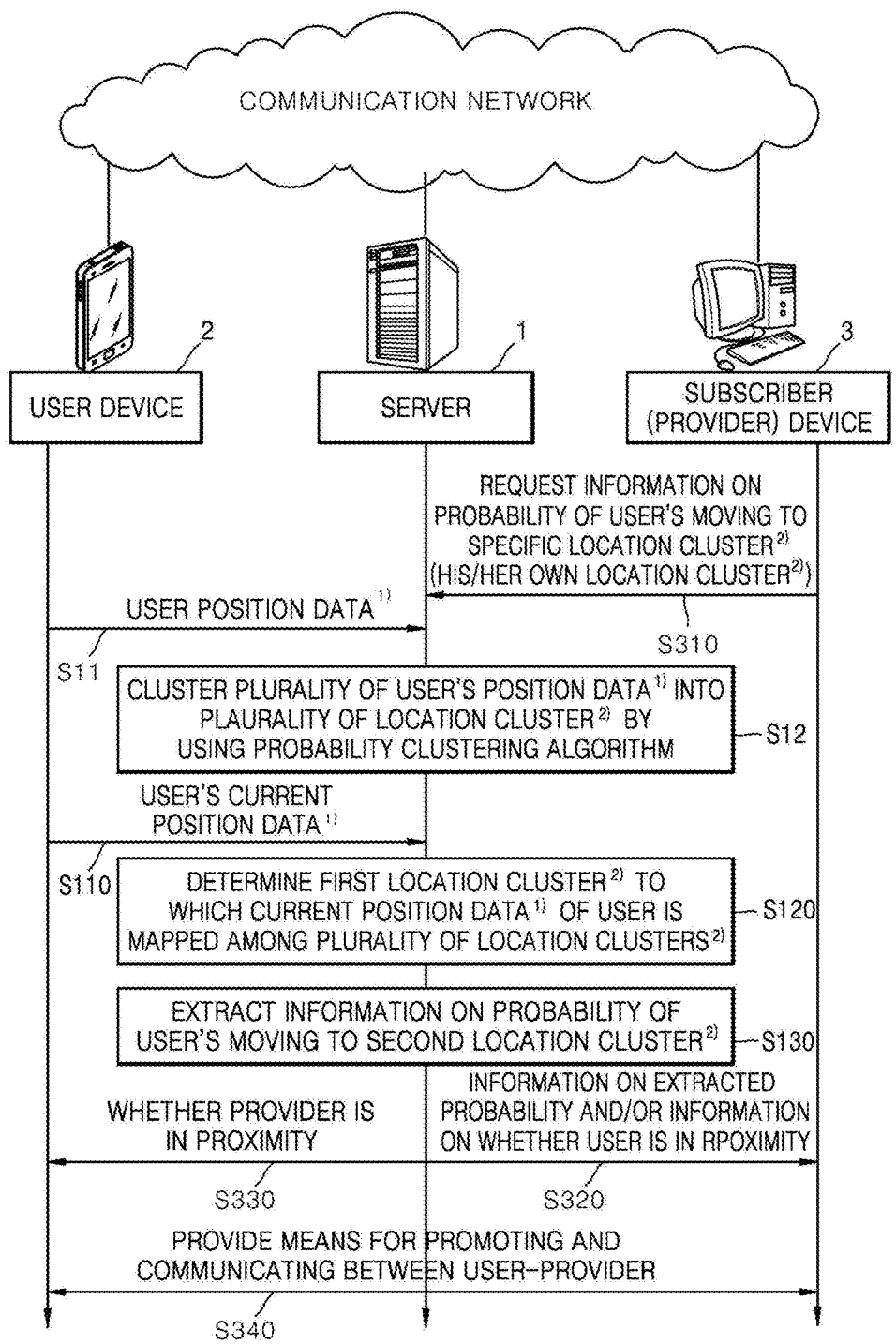

FIG. 22

| Attributes | Cluster #1 | Cluster #2 | Cluster #3 | Cluster #4 |
|---|---|---|---|---|
| Center Position | 37.44998698, 126.95228676 | 37.55262712, 126.92036011 | 37.47772852, 126.96042550 | 37.50945983, 126.88323413 |
| Std.Dev of Position | 0.00055934, 0.00026470 | 0.00174861, 0.00205345 | 0.00005763, 0.00030077 | 0.00013093, 0.00010790 |
| Max Distance | 0.130km | 0.414km | 0.098km | 0.032km |
| Mean Distance | 0.057km | 0.223km | 0.018km | 0.015km |
| Mean Velocity | 2.238km/h | 1.497km/h | 2.489km/h | 2.029km/h |
| Stay Time | 3.247h | 17.988h | 0.867h | 0.961h |
| # of data | 997 | 4646 | 498 | 259 |

| | Cluster #5 | Cluster #6 | Cluster #7 | Cluster #8 |
|---|---|---|---|---|
| Center Position | 37.57516469, 126.95891735 | 37.50267880, 127.00545821 | 33.48489745, 126.48909229 | 33.47525227, 126.51522698 |
| Std.Dev of Position | 0.00152664, 0.00089415 | 0.00008205, 0.00009322 | 0.00353628, 0.00555080 | 0.00007800, 0.00008131 |
| Max Distance | 0.289km | 0.025km | 1.707km | 0.024km |
| Mean Distance | 0.181km | 0.011km | 0.522km | 0.010km |
| Mean Velocity | 1.575km/h | 1.310km/h | 1.641km/h | 1.090km/h |
| Stay Time | 2.178h | 0.963h | 40.888h | 1.641h |
| # of data | 552 | 420 | 7342 | 114 |

| | Cluster #9 | Cluster #10 | Cluster #11 | Cluster #12 |
|---|---|---|---|---|
| Center Position | 33.50674331, 126.49359722 | 33.42836512, 126.92978826 | 33.46081856, 126.93331885 | 33.37233491, 126.85555613 |
| Std.Dev of Position | 0.00065065, 0.00037054 | 0.00229150, 0.00227612 | 0.00020887, 0.00072422 | 0.00009162, 0.00029429 |
| Max Distance | 0.134km | 0.595km | 0.154km | 0.056km |
| Mean Distance | 0.073km | 0.310m | 0.065km | 0.026km |
| Mean Velocity | 3.012km/h | 3.334km/h | 1.246km/h | 1.996km/h |
| Stay Time | 1.113h | 7.939h | 1.568h | 0.423h |
| # of data | 135 | 49397 | 269 | 305 |

| | Cluster #13 |
|---|---|
| Center Position | 37.55917218, 126.80341988 |
| Std.Dev of Position | 0.00040146, 0.00081331 |
| Max Distance | 0.066km |
| Mean Distance | 0.040km |
| Mean Velocity | 3.079km/h |
| Stay Time | 0.963h |
| # of data | 549 |

DATA PROCESSING METHOD, DATA PROCESSING DEVICE, DATA COLLECTING METHOD AND INFORMATION PROVIDING METHOD

STATEMENT REGARDING GOVERNMENT FUNDED RESEARCH

The invention was supported by ICT & Future Planning, the Ministry of Science, the Republic of Korea Government under Contract Number NRF-2017R1D1A1B03029788 awarded by the National Research Foundation of Korea (NRF). The Government has certain rights in the invention.

TECHNICAL FIELD

The present disclosure relates to a human mobility pattern information technology for clustering very large number of time-stamped human mobility data and a technology for extracting and representing a pattern represented by the human mobility data by providing a transition probability between the clustered regions.

BACKGROUND ART

In various research fields including computer engineering and electronics, a human mobility model may make a precise research result or more value-added product. Accordingly, there have been needs for realistic information on a human mobility pattern in various fields of research and industry. For example, a spread pattern of epidemic diseases or a virus spread pattern over the internet is more likely to be affected by the human mobility pattern, and accordingly related researches have been conducted. In addition, for the purpose of juvenile protection, in order to figure out influence by places where young people frequently visit, the places where young people frequently visit have been investigated, and related researches are based on mobility data collected by portable GPS devices carried by young people. There have been needs for a human mobility model a mobile ad-hoc network field for performance prediction and simulation, and in other research fields, there have been strong needs for a realistic human mobility model. One of researches in the complex system physics field shows that up to 93% of human mobility patterns may be predicted. Since a mobile device including a positioning system such as a smart phone or a navigation system is widely used, lots of information for human mobility patterns may be collected in very high precision. Typically, such a device includes a global positioning system (GPS) function or a WiFi-based positioning system (WPS) function. Another simple positioning method is to obtain a location of an adjacent base station, when a mobile phone is connected to the base station. Such a new technology leads to the next step for human mobility research. For example, a human mobility pattern may be found by using a GPS or WPS device having a function of collecting location information of a carrier and by storing and processing information obtained therefrom.

Researches on human mobility are largely divided into two of an individual model and a group model. The individual model is affected by personal parameters such as gender, age, or job, and also by psychological parameters. For example, habits or tendencies of humans selecting a route are researched and resulted that straight. clean roads are preferred. Furthermore, a social orbit based research has been also conducted which figures out frequently visited sites on the basis of a social network of people. The group mobility model is explicitly found in a military group. In such groups, a leader may greatly affect the group's mobility pattern.

DISCLOSURE OF THE INVENTION

Technical Problem

The present disclosure provides a technology for filtering a plurality of data to be proper to a user's purpose, clustering a plurality of clusters, and extracting and representing a pattern embedded in the big data by providing transition probabilities between the clusters.

The present disclosure also provides a technology for deriving and representing a pattern embedded in human mobility data by using data pertaining to human mobility as an example of big data.

Objects of the present invention are not limited to those described above and other objects will be clearly understood by those skilled in the art from the following description.

Technical Solution

To achieve the purpose, a data processing method according to an aspect of the present invention is provided. This method includes: receiving current data of a target of interest; and determining a first area to which the current data is mapped among a plurality of pre-determined information areas. At this point, the plurality of information areas are created by processing a plurality of pre-collected data with a probability based clustering algorithm. Here, 'data processing method' may be called as 'a method of mapping information area of data'.

A data processing method according to another aspect is provided. The method includes: receiving a plurality of data for a target of interest; and creating data-pattern pertaining to a plurality of information areas by processing the plurality of data with a probability based clustering algorithm. Here, the 'data processing method' may be called as 'data-pattern creating method'.

At this point, the data processing method may further include receiving one or more new data pertaining to the target of interest; and refining information on the plurality of information areas by using the one or more data. Alternatively, the plurality of data may include attribute of time.

Alternatively, the information area may be a union of cluster-areas corresponding to attribute of interest and complementary set-areas not belonging to the cluster-areas. At this point, the creating may include filtering error data among the data on the basis of attribute of the data; dividing the plurality of data into a plurality of initial information areas; refining the plurality of initial information areas to a plurality of second information areas by using probability based clustering; extracting statistics of data belonging to each area of the plurality of second information areas; representing relation between the cluster-areas with a probabilistic function and the cluster-areas with a mathematical state by using the statistics. At this point, the mathematical state means each of the cluster-areas and the probabilistic function represents relation-probability between the cluster-areas.

At this time, for clustering, a pre-determined probability function may be used as an equation according to attribute of the data.

A data processing apparatus according to another aspect is provided. The apparatus includes a processing unit; and a communication unit. At this point, the communication unit receives a plurality of data pertaining to a target of interest, and the processing unit determines a first area to which the current data is mapped among a plurality of pre-determined information areas. The plurality of information areas are created by processing a plurality of pre-collected data with a probability based clustering algorithm.

A data processing apparatus according to yet another aspect includes a processing unit; and a communication unit. At this point, the communication unit receives a plurality of data pertaining to a target of interest, and the processing unit creates data-pattern pertaining to a plurality of information areas by processing the plurality of data with a probability based clustering algorithm.

At this point, the information area is a union of cluster-areas corresponding to attribute of interest and complementary set-areas not belonging to the cluster-areas. In addition, the processing unit may filter error data among the data on the basis of attribute of the data; divide the plurality of data into a plurality of initial information areas; refine the plurality of initial information areas to a plurality of second information areas by using probability based clustering; extract statistics of data belonging to each area of the plurality of second information areas; represent relation between the cluster-areas with a probabilistic function and the cluster-areas with a mathematical state by using the statistics.

At this point, the target of interest may be a user, the data may be, as position data of the user including time, latitude, and longitude information (or global positioning information data specifying a global position identically to latitude and longitude), and the information area may be a location cluster.

A method of collecting information on a target of interest according to still another aspect of the present invention is provided. The method includes: requesting information on a target of interest from a server, which is that a relation-probability that attribute of interest of data of the target of interest is to be included in a category of attribute of a specific information area among a plurality of information areas satisfy a pre-determined rule; and receiving the information on the target of interest from the server. At this point, whether the relation-probability satisfies the pre-determined rule is determined by performing processes of receiving, by the server, information on current data of the target of interest, determining a first information area to which the current data is mapped among the plurality of information areas, and determining whether a relation-probability that attribute of interest of data of the target of interest is to be included in a category of attribute of interest of the specific information area satisfies the pre-determined rule in a state of being included in a category of attribute of interest of the first information area.

At this point, the plurality of information areas may be created by processing a plurality of pre-collected data pertaining to the target of interest with a probability based algorithm.

A method of collecting information on a target of interest according to yet still another aspect of the present invention is provided. The method includes: requesting from a server information on a relation probability that attribute of interest of data for a target of interest is to be included in a category of attribute of interest of a specific information area belonging to a plurality of pre-determined information areas; and receiving the information on the relation-probability from the server. At this point, the relation-probability is calculated by a server by performing process of determining a first information area to which current data of a target of interest is mapped among the plurality of information areas, and extracting information on the relation-probability that attribute of interest of data of the target of interest is to be included in a category of attribute of interest of the specific information in a state of being included in a category of attribute of interest of the first information area.

At this point, the plurality of information areas may be created by processing a plurality of pre-collected data for the target of interest with a probability based clustering algorithm.

A method of providing information on a target of interest according to another aspect of the present invention is provided. The method includes: receiving current data of the target of interest; determining a first information area to which the current data is mapped among a plurality of pre-determined information areas; and providing information on relation-probability that attribute of interest of data of the target of interest is to be included in a category of attribute of interest of a second information area belonging to the plurality of information areas in a state being included in a category of attribute of interest of the first information area. At this point, the plurality of information areas may be created by processing plurality of pre-collected data for the target of interest with a probability based clustering algorithm.

At this point, the information on the relation-probability may be information on whether the relation-probability is greater than a pre-determined threshold value.

At this point, the target of interest may be a user, the data may be position data of the user including time, latitude, and longitude information, the information area may be a location cluster, and the attribute of interest may be the latitude and the longitude.

To solve the purpose of present invention, a method of determining a user' position includes: receiving current position data of the user; and determining a. first location cluster to which the current position data is mapped among the plurality of location clusters, wherein the plurality of location clusters are created by processing a plurality of position data for a user with a probability based clustering algorithm.

A method of creating a position information model according to yet still another aspect of the present invention includes: receiving a plurality of pieces of position information on a user; and creating information on a plurality of location clusters by processing the plurality of pieces of position information with a probability based clustering algorithm.

A sever for processing position information according to still another aspect of the present invention includes: a communication unit and a processing unit. The communication unit receives current position data of the user and the processing unit determines a first location cluster to which the current position data is mapped among the plurality of location clusters, wherein the plurality of location clusters are created by processing a plurality of pre-collected data with a probability based clustering algorithm.

A sever for processing position information according to still yet another aspect of the present invention includes: a communication unit and a processing unit. The communication unit receives a plurality of pieces of position information on a user, and the processing unit creates information on a plurality of location clusters by processing the plurality of pieces of position information with a probability based clustering algorithm.

A method of collecting user information according to a still another aspect of the present invention includes:

requesting information on a user from a server, which is that a probability that the user moves to a specific location cluster including a pre-determined specific position among a plurality of location clusters satisfies a pre-determined rule; and receiving the information on the user from the server, wherein, whether the probability satisfies the predetermined rule is determined by the server by executing processes of receiving information on current position of the user, determining a first location cluster including the current position among the plurality of location clusters, and a probability of moving from the first location cluster to the specific location. cluster satisfies a predetermined rule.

A method of collecting user information according to a yet still another aspect of the present invention includes: requesting, from a server, information on a probability that the user moves to a specific location cluster belonging to a plurality of pre-determined location clusters; and receiving the information on the probability user from the server, wherein the probability is calculated by the server by executing processes of determining a first location cluster including a current position of the user among the plurality of location clusters, and extracting information on a probability that the user moves from the first location cluster to the specific location cluster.

A method of collecting user information according to a yet still another aspect of the present invention includes: receiving current position of a user and determining a first location cluster including the current position among a plurality of pre-determined location clusters; and providing information on a probability that the user moves the first location cluster to a second location cluster belonging to the plurality of location clusters, wherein the plurality of location clusters are created by processing a plurality of pieces of pre-collected position information with a probability based clustering algorithm.

Advantageous Effects

According to the present invention, a technology can be provided which clusters a plurality of big data pattern information into a plurality of clusters and provides transition probabilities between the clusters in probability function type.

Furthermore, a technology can be provided which extracts and represents a pattern embedded in human mobility data.

The effects of the present invention are not limited to the above mentioned effects, and other effects not mentioned above may be clearly understood through claims by those skilled in the art.

BRIEF DESCRIPTION OF THE DRAWINGS

FIG. 1 shows a result of a basic experiment for extracting human mobility data which is an example of big data;

FIG. 3 shows a numerical result of a clustered position data set;

FIGS. 6A to 6C are views for explaining a method of providing position information according to an embodiment of the present invention;

FIGS. 8A and 3E are views for explaining detailed examples of an operation described in relation to FIG. 7;

FIG. 9 is a view for explaining a method of processing user information according to another embodiment.

FIG. 22 shows detailed information on 13 clusters created from the big data which is obtained from the second subject of FIG. 12.

MODE FOR CARRYING OUT THE INVENTION

Figure 2:
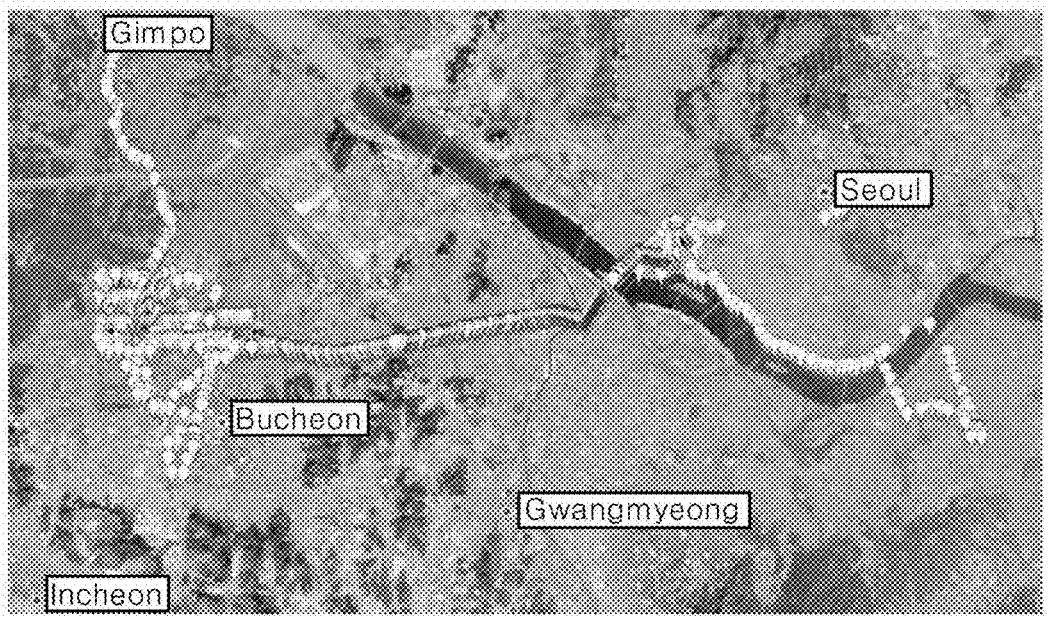
FIG. 2 show an original document for a clustering experiment obtained from a collected data set for daily mobility of a student.

Hereinafter, specific embodiments will be described in detail with reference to the accompanying drawings. However, the present invention is not limited to the specific disclosed embodiments, but may be implemented in various forms. The embodiments of the present inventive concept are provided so that this disclosure will be thorough and complete, and will fully convey the concept of the invention to those skilled in the art.

The spirit of the present invention is presented on the basis of a collective and abstract concept called as big data. In order to assist understanding of the present invention, description herein is made for data for position and/or mobility of a human as an example. Hereinafter position data is considered as an example of big data.

<Obtaining Human Mobility Data>

In an experiment for an embodiment of the present invention, daily life mobility of a student was figured out on the basis of a complex human mobility model structure. A daily mobility pattern of the student was collected by the student himself who carried a commercial portable global position system (GPS) device. GPS data collected by the GPS device is stored for 20 days or more. Position data includes <time, latitude, longitude> tuple as well as some information which is not essential. However, such a raw numerical form is difficult to use due to the following reasons:

Numerical data is not intuitive and is difficult to be perceived by a human. Such data is necessary to be analyzed in a human friendly type.

Due to characteristics of a GPS device, data may include inherent errors in position. Due to influence of inherent errors and locational environment that the GPS device has, even though the GPS device temporarily stops, collected data may output a result that the GPS device have moved. Errors caused by the locational environment may be very serious. In particular, when the device is inside a building, lots of positional errors as well as continuous errors may be collected due to a weak GPS signal that is blocked or distorted by the building or obstacles.

Accordingly, it is difficult to ensure that one positional data represents a precise position of a human. In order to detect an error of the collected position data, it is necessary to collect the significant number of data sets for a. significant time period.

The significant number of data sets for a significant time period is necessary for being perceived. Aggregating the significant data for a significant time period is called as clustering, and, to this end, an embodiment of the present invention employs a clustering scheme. The data clustered in this way may be represented as position information such as a building name, a street name, a city name, or a university name. In an embodiment of the present invention, a clustering technique is used which is based on an expectation-maximization (EM) algorithm is used for an individual mobility configuration or a proper clustering scheme may also be used which is based on a recent research like Levy Walk. To this end, hereinafter an EM clustering algorithm and an EM clustering calibration method used in an embodiment of the present invention are described. In addition, an experiment result based on collected GPS data is described.

<Clustering by Expectation Maximization>

The EM algorithm was first introduced in 1958 by Hartley et. al, and developed by Dempster et. al, in 1977. The EM algorithm generates an initial model and iterative refinements for a data set lead maximum likelihood which is known as an optimal model. A probability that a target belongs to a mixed model may be iteratively calibrated to be the optimal model, and model suitability may be determined by a log-likelihood function. In other words, the EM algorithm is a probability based clustering algorithm. Using a parameter θ, a random variable X for an observation result, and an unobservable random variable Z, a probability distribution of (X, Z) may be represented as L(θ; X,Z)=p(X, Z|θ). Therefore, this is necessary to be maximized with a likelihood function as Equation (1):

$$L(\theta; X) = p(X|\theta) = \sum_Z p(X, Z|\theta) \qquad \text{Equation (1)}$$

Due to a stepwise approach method of the EM algorithm, parameter $\theta^{(t)}$ is calculated and, in the next step, $\theta^{(t+1)}$ is calculated. These steps are divided into an expectation step (E) and a maximization step (M). In the expectation step, the algorithm defines an expectation value Q of a given likelihood function of $\theta^{(t)}$ as Equation (2):

$$Q(\theta|\theta^{(t)}) = E_{Z|X,\theta(t)}[\log L(\theta; X, Z)] = \sum_Z p(Z|X, \theta^{(t)})\log L(\theta; X, Z) \qquad \text{Equation (2)}$$

in the maximization step, the algorithm maximizes Q as Equation (3) to calculate $\theta^{(t+1)}$:

$$\theta^{(t+1)} = \arg_\theta \max Q(\theta|\theta^{(t)}) \qquad \text{Equation (3)}$$

When realizing in practice, $\theta^{(t)}$ is initialized with another proper value (or vector) and iteratively calculates $\theta^{(t)}$ to an approximation level within a desired range.

<EM Clustering Scheme According to an Embodiment of the Present Invention>

In an embodiment of the present invention, firstly, a proper clustering scheme is defined. Human mobility data collected from a GPS device is used, and accordingly a probability model is determined for EM clustering. A normal distribution, which is typically known as a Gaussian distribution, may be used. However, such a normal distribution may not be proper to an embodiment of the present invention. In case based on an experiment using the normal distribution, since a human mobility model shows a heavy-tailed distribution so called Levy Walk, a very imprecise clustering result may be obtained. In addition, the human mobility pattern was observed as concentrated for a specific time period (residence period of human) in a region within 1 or 2 km (residence area, namely, cluster). Transition between resident areas shows power law distribution (transition period. of human mobility). Accordingly, in an embodiment of the present invention, a power law distribution similar to an exponential distribution may be used. Such a distribution may be called as a transformed exponential distribution, and a parameter is a distance that a human moves from the center portion of the residence area. The following equation (4) represents a probability distribution used in an embodiment of the present invention.

$$P(x) = e^{-\lambda x} \qquad \text{Equation (4)}$$

Here, λ denotes an average radius of a cluster, which is a controllable parameter, may be fixed in a constant value and calculated by a proper algorithm, and x denotes a distance between a current position of a human and the center of the cluster.

In addition, a velocity of a mobile human may also be considered. For a residence period of human mobility, a velocity of 10 Km/h or less may be recognized as a stay state. A velocity of a human moving at a specific time may be calculated with position data such as GPS, and a velocity threshold value of 10 Km/h may be set by a maximum walking speed of a human. In addition, one or more GPS data having a velocity of 10 Km/h or higher may be considered as a transition period, and, at this point, a human may be considered in a move state.

With this classification of move state and stay state, a parameter of an area size of cluster, namely, a cluster diameter may be considered. In an embodiment of the present invention, the cluster diameter may be defined as up to several kilometers in consideration of a usual walking distance of a human and a maximum size of building complex. When the cluster diameter is set as large, rough mobility pattern of a human may be figure out. When the cluster diameter is set as small, more precise human mobility pattern may be obtained. However, calculation amount may be explosively increased according to the cluster diameter. As the result, in an experiment according to an embodiment of the present invention, 2 Km or 3 Km is selected as the cluster diameter on the basis of an initial stage of experiment. In consideration of such basic parameters, clustering for human mobility may be performed with the following operations.

Initialize clusters with points of position information such as GPS inside the clusters Calculate the number of points in the clusters Calculate a probability that each of the position information points belongs to a cluster with the probability distribution like Equation (4)

Calibrate the probability of a point belonging to a cluster with a velocity of a mobile human represented by each point Iterate an EM clustering algorithm Since a higher velocity implies a move state of a point and thus implies the point is less likely to be a member of the cluster, the probability of the point's belonging to a cluster may be calibrated with velocity of the point. With high velocity, the calibration process may greatly reduce the probability of a point being a member of a cluster.

<Experiment Process>

Basic Experiment

In an experiment example according to an embodiment of the present invention, position data for daily life of a student, which is obtained from positioning systems, is used. Among the positioning systems, a GPS and a 3G base station (3GBS) positioning system, which are two typical positioning systems under actual service, are used. In this experiment, usefulness of the position data is firstly figured out. That is, it is confirmed whether the data collected from the positioning systems are accurate enough to represent an actual position with tolerable errors. Since a typical positioning technology using positions of the 3GBS has tendency to have errors in position (frequency change of base station) due to weakness of radio signal strength (RSS) system, usefulness thereof is in doubt. In addition, a current GPS system has explicit limitations. That is, a GPS signal is reduced or distorted in a building. Here, a very basic experiment is conducted. For fixed positions, GPS and 3GBS position data are collected inside and outside the building for several hours. For GPS data collection, a Garmin GPS device is used. For 3GBS data collection, a commercial Galaxy Tab having a 3G positioning function is used. Here, points are the nearest base station connected to the Galaxy tab.

FIG. 1 shows a result of the basic experiment for extracting mobility data of a human, which is an example of big data. GPS and 3GBS data inside a building and outside area are represented. # of data means the number of total data obtained for each experimental situation. In the experiment, 2187 position data is obtained with a GPS in the outside area situation. A position change between two consecutive position data is detected and the data are considered as errors because the positioning system is fixed at an experiment position. The distance between the two consecutive data is an error distance. The error distance is in the unit of meter. A column of Average shows an average value of the error distance and a standard deviation of the error distance. Maximum column shows a maximum error distance. The last column of Error Ratio shows a ratio of error in each sub-experiment. A result according to GPS-inside, which is one of the sub-experiments, is interesting. When the GPS device is not able to obtain a GPS signal, since the GPS device automatically estimates a position of the GPS device by using past velocity data, an internal result by using Garmin GPS device may be meaningless. In other words, when the GPS device misses the GPS signal inside a building, the GPD device only estimates a current position. Feature of "user friendly estimation" of such a policy of a device manufacturer causes a greater error in the position error and thus the experiment result is not realistic. Even though it is found that a 3GBS operates inside a building in this experiment, this shows a very large position error compared to the GPS data. In addition, 36% or more of 3GBS data has errors. The GPS data shows 12.30% errors and a distance from an error position is 52 meters maximum and within a range of typical building. Thus, the GPS device is used for collecting additional positioning data for the experiment.

<Clustering for Mobility Recognition>

A clustering experiment was conducted as shown in FIG. 2 from a data set collected for daily mobility of a student. A mobile GPS device was used, and a result is visualized with MapSource and Google Earth. Data was collected for one month and visually verified by a volunteer for data collection by using Google map. A data collection area is a metropolitan area of Seoul, Korea including student' home in Incheon, and student's university in Seoul, and including mobility trajectory Bucheon and Gimpo. In FIG. 2, GPS data collection per minute is shown using Google Earth. As expected, a lot of positioning points are concentrated on two areas, home and company. This GPS data set is clustered by using an EM based clustering technique and, as a result, several major clusters are recognized. Hereinafter, detailed result and review are descried for this experiment.

<Experiment Results and Analysis>

Figure 4:
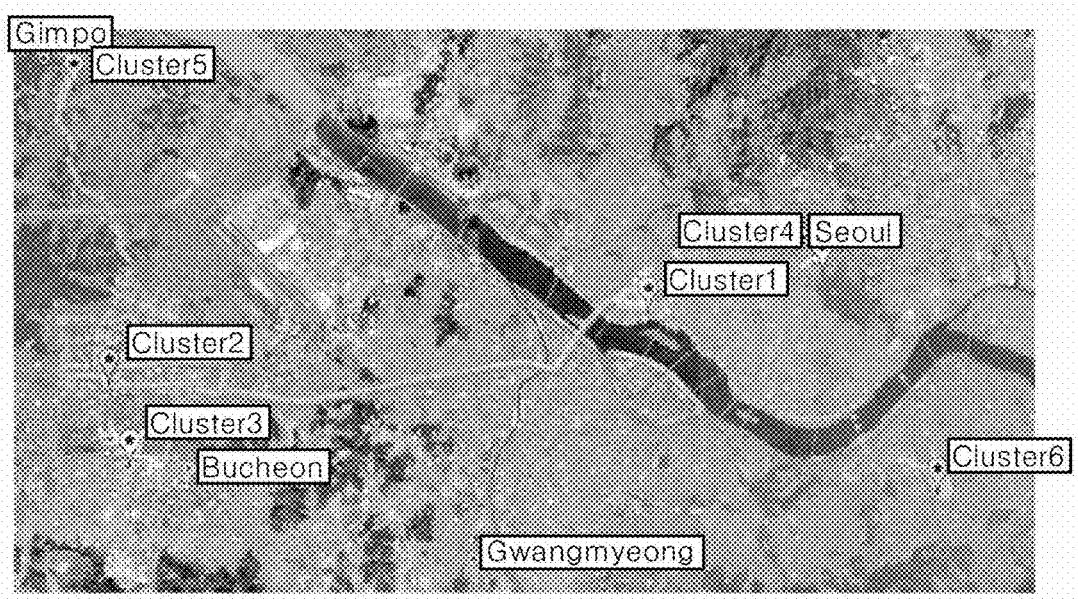
FIG. 4 shows clusters positioned on a realistic map, which are visualized from the result of FIG. 3.

FIG. 3 shows a numerical result of clustered position data set. Six clusters are recognized and verified by a positioning data collector. FIG. 3 shows cluster information including a center position of each cluster, a standard deviation of positions of cluster members in each cluster, a maximum cluster radius in an initialization phase, an average radius of each cluster, a standard deviation of radius, an average speed of cluster members in each cluster, time spent in each cluster, ratio of stay time inside each cluster, the number of position data in each cluster. As expected, the biggest clusters are found around home at Incheon and company area around Mapo, Seoul, while other minute clusters are for downtown area of Bucheon, a restaurant at Gimpo, an unusual visit to the center of Seoul, and a dental clinic visit to southern part of Seoul known as Gangnam. FIG. 4 shows the clusters located on a real map as a visualization of results of FIG. 3. For example, in human intuition, cluster #1 denotes Hongik University. This intuitive result is more human friendly, when numerical position data may be automatically mapped to institute names.

In this clustering experiment, major areas of human mobility model may be successfully extracted for a given data set.

According to the above-described experiment, a daily mobility pattern of a subject is figured out. Major positions for daily life of a student's are identified by using GPS trajectory data and an EM clustering algorithm. Based on these results, a mobility model in a Markov Chain type may be created as shown in FIG. 5.

In an embodiment of the present invention, modeling may be conducted by clustering a part of data or entire data to a plurality of cluster-areas, representing the cluster-areas in mathematical states, and representing relation between the cluster-areas in a probability function. The above-described Markov Chain model may be one type of such a model.

Figure 5:
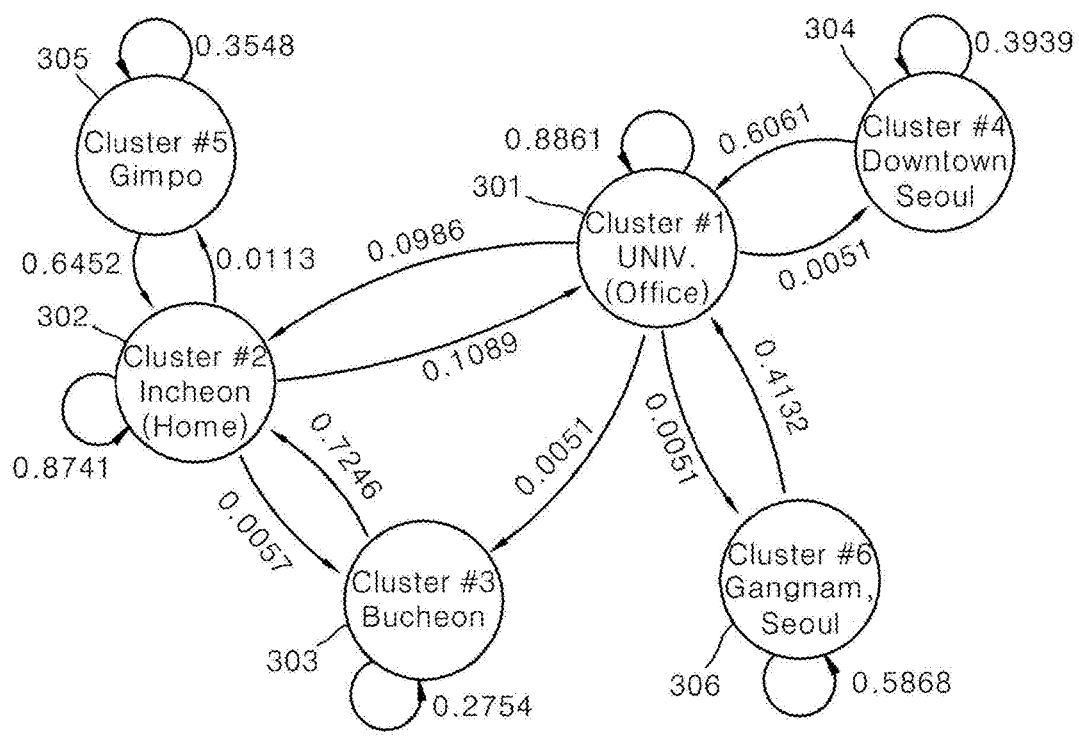
FIG. 5 shows a result that a Markov Chain type mobility model is generated on the basis of a result that major places for daily life of a student are classified by using GPS trajectory data and EM clustering algorithm.

FIG. 5 shows six states related to clusters obtained by using position data of an observation target (one person or one group) and the above-described clustering algorithm and a transition probability between the states. For example, a state 305 denotes a state located at cluster #5 that the observation target is named as Gimpo, a state 302 denotes a state located at cluster #2 that the observation target is named as Incheon.

According to the model of FIG. 5, the state 305 may be changed only into the state 302 or the state 305 and a sum of two probabilities is 1.000. In addition, the state 302 may be changed only into the state 305, a state 303, a state 301, and the state 302, transition probabilities to each state are 0.0113, 0.0057, 0.1089, and 0.8741, respectively. Other states 301, 306, and 304 may be similarly described.

Various applications may be developed by using a model like FIG. 5. For example, a case is described that an observation target moves from the state 306 to the state 301. Shop #1, shop #2 and shop #6 may exist respectively in cluster #1, cluster #2, and cluster #6.

In this situation, according to the model of FIG. 5, since a probability that an observation target moves from cluster #6 to cluster #1 is 0.4132, that is, a probability that the state 306 is transitioned to the state 301 is 0.4132, it is benefit that shop #1 in cluster #1 transmits marketing information to the observation target in cluster #6 to induce the observation target to buy.

On the contrary, since a probability that the observation target in cluster #6 immediately moves to cluster #2 is 0, it is relatively less benefit that shop #2 in cluster #2 immediately deliver marketing information to the observation target in cluster #6.

However, when the observation target is located in cluster #1, since a probability that the observation target moves from cluster #1 to cluster #2 is 0.0986, that is, a probability that state 301 is transitioned to the state 302 is 0.0986, benefit may be increased when shop #2 in cluster #2 immediately delivers marketing information thereof to the observation target in cluster #1.

When the position of the observation target is divided into a plurality of groups (clusters) and transition probabilities between groups are known, various services may be developed on the basis of information on a current position of the observation target. As described above, when some of position information collected from the observation information may not belong to any one of the above-described plurality of clusters, such information may imply that the observation target is on the move.

The more data used for clustering, the more complex human mobility patterns according to various environments may be investigated. However, the more data, the longer the calculation time taken for clustering. Therefore, the embodiment is not limited to the EM clustering algorithm, and may use another kind of probabilistic clustering algorithm.

A preprocessing operation and post-processing operation may be respectively added before and after the clustering operation. The collected position data may be erroneous. When clustering is conducted with erroneous position data, an accurate result is not obtained. Thus, in the preprocessing operation, the erroneous position data may be filtered. For this filtering, a one class support vector machine (OCSVM) may be used. The clustered results may be presented in a tuple type of <latitude, longitude>, but this type is difficult to understand the meaning. Thus, the post-processing operation of mapping the clustered results to documents such as an area name, or a building name may be performed for giving user friendliness.

<Embodiment 1>

Figure 6B:
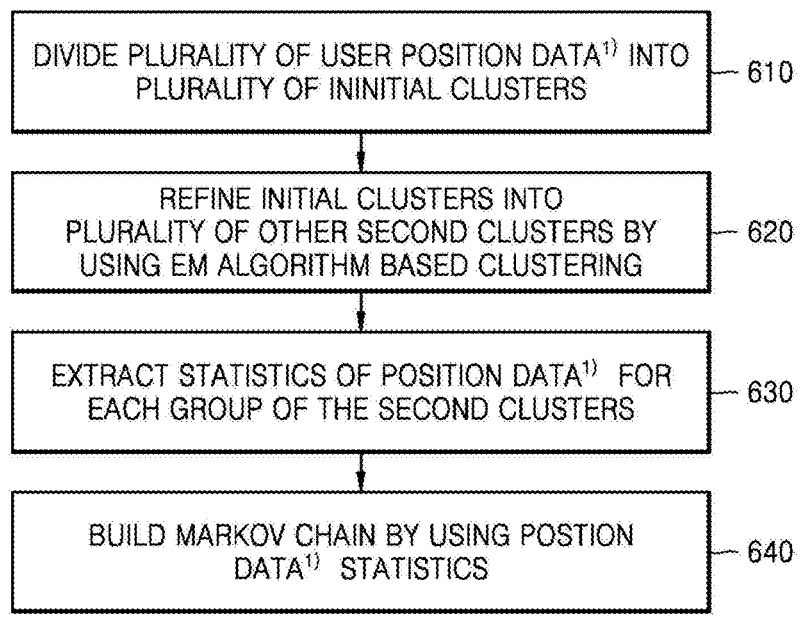
Figure 6C:
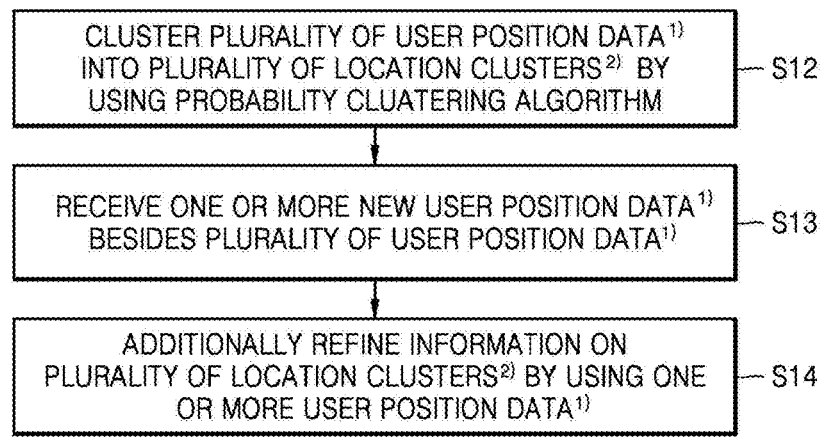

FIGS. 6A to 6C are views for explaining a method of creating a position information model of a user and a method of determining a position of the user according to an embodiment of the present invention. In order to create a position information model of a user and determine a position of the user, a user device 2 carried by the user and/or a server 1 may be adopted. Here, the position information model may be called as 'position pattern'.

Hereinafter, a method of creating a position information model according to an embodiment of the present invention is described with reference to FIG. 6A. This position information model creation method may be executed by the server 1. The position information model may include an element that, for example, a Markov Chain concept shown in FIG. 5 is embodied.

This position information model creating method may include operation (S11) of receiving a plurality of user's position data collected from a user staying or moving with the user device. Here, the position data may be considered as an example of big data. Here, the plurality of user's position data may be created by the user device 2 which detects GPS information thereof. A single user may carry a plurality of user devices 2 at the same time or alternately. At this point, even though a device identifier for identifying each of the plurality of user devices 2 may be different from each other, each user device 2 may include one user identifier identifying the single user carrying it. Although the user device 2 directly provides a plurality of user position data in FIG. 6A, the user device 2 may store the plurality of user position data in another third device and then the third device may provide the stored information to the server 1 in a modified embodiment. When the present invention is realized in practice, the user's position may be treated identically to a position of the user device.

Next, the position information model creating method may include operation (S12) of clustering the plurality of user position data into a plurality of location clusters by processing them with a probability based clustering algorithm and creating information on the plurality of location clusters. Here, 'location cluster' may be considered as an example of 'information area' formed by clustering a set of big data. Here, the probability based clustering algorithm may be, but is not limited to, an EM algorithm described through Equation (1) to Equation (4). In addition, information on the plurality of location clusters may include, as shown in FIG. 4, information on the clustered location clusters may include information on a probability of moving from one location cluster to another location cluster among the location clusters. In other words, the information on the plurality of location clusters may include, for example, as shown in FIG. 5, information on cluster #1 to cluster #6 301 to 306, and include information on probability of moving from any one cluster to another cluster among the clusters. Each location cluster or each cluster may include information on a range of global position that is symbolized by the cluster itself. The information on the plurality of location clusters may be a concept identical to the Markov chain shown in FIG. 5 or a concept including or similar to a Markov chain.

The creating operation (S12) may include subdivided operations. Regarding this is described with reference to FIG. 6B.

That is, a plurality of user position data are divided into a plurality of initial clusters (operation S610). At this point, the initial clusters may be made according to an arbitrary pre-defined deterministic rules or random rules.

Next, the initial clusters are refined to a plurality of second clusters having different boundary areas from the initial clusters by using EM algorithm based clustering described through Equation (1) to Equation (4) (operation 620). At this point, as a probability density function used for the EM algorithm based clustering, for example, an equation representing Levy walk may be used. Here, the Levy walk is a known concept presented in an article titled "Understanding individual human mobility patterns", Marta C. Gonzalez et al., Nature, 2008.

Next, position data statistics are extracted from each group of the second clusters (operation S630). Here, the 'position data' may be considered as an example of 'big data'. At this point, the position data statistics may include information such as a center position of each group, a standard deviation of positions, a mean radius, stay time, and the number of GPS data.

Next, a Markov chain is built by using the position data statistics (operation S640). At this point, states in the Markov chain means each location cluster and a transition probability means a mobility probability (relation probability) between the location clusters.

When two operations S11 and S12 are performed, one position information model may be created. The one position information model may represent a mobility pattern of one user.

Next, a method of updating the position information model is described with reference to FIG. 6C. That is, after performing the above-described operation S12, one or more pieces of new user position data are further provided besides the plurality of user position data (operation S13). Next, the information on the plurality of user data is additionally further refined by using one or more user position data (operation S14). That is, information on the plurality of location clusters generated in operations S11 and S12, that is, the position information model, may be updated by receiving and using new user position data. When operations S13 and S14 besides operations S11 and S12 are executed, operations S13 and S14 may be executed before operation S110 in FIG. 6A is executed.

All the above-described user position data may include latitude/longitude at which the user is located when the information is obtained, and information on the obtained time.

Although operations S12 to S14 for the method of creating the position information model are executed by the server 1, the user device 2 having higher calculation ability may directly execute operations S12 to S14. In this case, operation S11 of obtaining, by the server 1, user position data may be omitted.

<Embodiment 2>

Hereinafter, a method of determining user's position according to another embodiment of the present invention is described with reference to FIG. 6A. This user's position determining method may be executed by the server 1.

This user's position determining method may include operation S110 of receiving a user's current position. The user's current position may be created by detecting, by a user device 2 carried by the user, global positioning information thereof. The user may carry two or more user devices at the same time or alternately. Accordingly, the user device transmitting user position data in operation S11 and the user device transmitting user position data in operation S110 may be the same or different from each other.

Next, the user position determining method may include operation S120 of determining a first location cluster including the user's current position among a plurality of pre-determined location clusters. Here, the plurality of pre-determined location clusters may be generated in operation S12. That is, the plurality of pre-determined location clusters may be generated by processing the plurality of user position data collected in operation S11 with the probability based clustering algorithm.

That is, according to this embodiment, user position data is not simply determined as a single longitude and latitude value according to global position information, but is mapped to the plurality of location clusters generated by using the probability clustering algorithm and using information on past positions of the user.

In FIG. 6A, although it is shown that each operation is executed in the server 1, the user device 2 may execute operations in a modified embodiment. In this case, the user device 2 is necessary to be able to execute operation S12. If not, the user device 2 is necessary to receive the information on the plurality of location clusters described in embodiment 1 from the server 1 that executes operations S11 and S12, and store the information.

<Embodiment 3>

Hereinafter, a method of providing user position information according to another embodiment of the present invention is described with reference to FIG. 6A. The user position determining method may be executed by the server 1.

In this embodiment, it is required that a current position of the user is determined according to operation S120 described in embodiment 2. Hereinafter, in embodiment 3, for convenience of explanation, it is assumed that the user's current position determined in operation S120 exists in a first location cluster.

The user's position information providing method may include operation S130 of extracting mobility probability information that the user moves from a first location cluster at which the user is currently positioned to a second location cluster. Here, the first and second location clusters may be respectively, for example, cluster #1 301 and cluster #2 302 of FIG. 5, and, at this point, the mobility probability information may be 0.0986 or a processed value therefrom. Here, the processed value may be, for example, 1 if the mobility probability is greater than 0.5, or 0 otherwise. However, the present invention is not limited hereto and various schemes are available.

On the other hand, each cluster shown in FIG. 5 corresponds to some of a plurality of location clusters obtained from the user position data. That is, location clusters may exist which are not represented by each cluster. Each cluster shown in FIG. 5 represents a space that the user mainly stays. When the user moves between these spaces, the created position data may not be included in each cluster. Accordingly, it may be easily understood that the above-described first location cluster is not limited to any one of clusters shown in FIG. 5.

Next, this user position information providing method may provide the mobility probability information to the subscriber device 3 (operation S140). Alternatively, when the mobility probability is very high, information (user proximity information) that the user arrives at a proximity position may be provided (operation S140). The provision may be performed through a wired or wireless network. Here, the subscriber device may be the same as or different from the user device. Here, the different case is described as an example. The subscriber device may be, for example, a device used by a business owner considering the user as a customer or a potential customer, and may be a mobile device or a fixed device.

When the business owner's workplace is in the second location cluster and the user moves to the second location cluster, since the user is likely to visit the business owner's workplace, the business owner may have great interest in a probability that the user moves to the second location cluster. Thus it may have meaning in terms of business that the server 1 provides, to the subscriber device 3, mobility probability information that the user moves from the first location cluster to the second location cluster as shown in FIG. 6A. According to embodiment 3, this business requirement may be met.

When the business owner's workplace is in another third location cluster, for example, cluster #3 303 of FIG. 5, the business owner is not likely to have interest in the probability that the user moves to the second location cluster. That is because the business owner's workplace is not in the second location cluster.

Accordingly, when there are a plurality of business owners and each of them uses different subscriber device 3, the server 1 does not have to provide user's mobility probability between location clusters to all the subscriber devices 3, and may or may not provide the mobility probability according to each business owner's need. For example, a subscriber device used by a business owner having workplace in an nth location cluster may receive only a probability that the user moves to the nth location cluster.

In addition, in operation S150, information that the user device 2 will approaches a provider after a predetermined time (provider proximity information) may be transmitted from the server 1 to the user device 2. Furthermore, together with or separately from operations S140 and S150, the server 1 may provide operation S160 of providing, by a provider of the subscriber device 3, a unit for promoting and performing communication to the user of the user device 2.

In the above, in order to explain what the subscriber device 3 is, concepts of business owner conducting commercial activity and workplace are used. However, it may be understood that the subscriber device is not limited hereto.

In FIG. 6A, although a position information providing method according to an embodiment is executed by the server 1, the providing method may be executed by the user device 2 in a modified embodiment. To this end, the user device 2 is necessary to be able to perform operations S120, S130, and S140 instead of the server 1.

<Embodiment 4>

Figure 7:
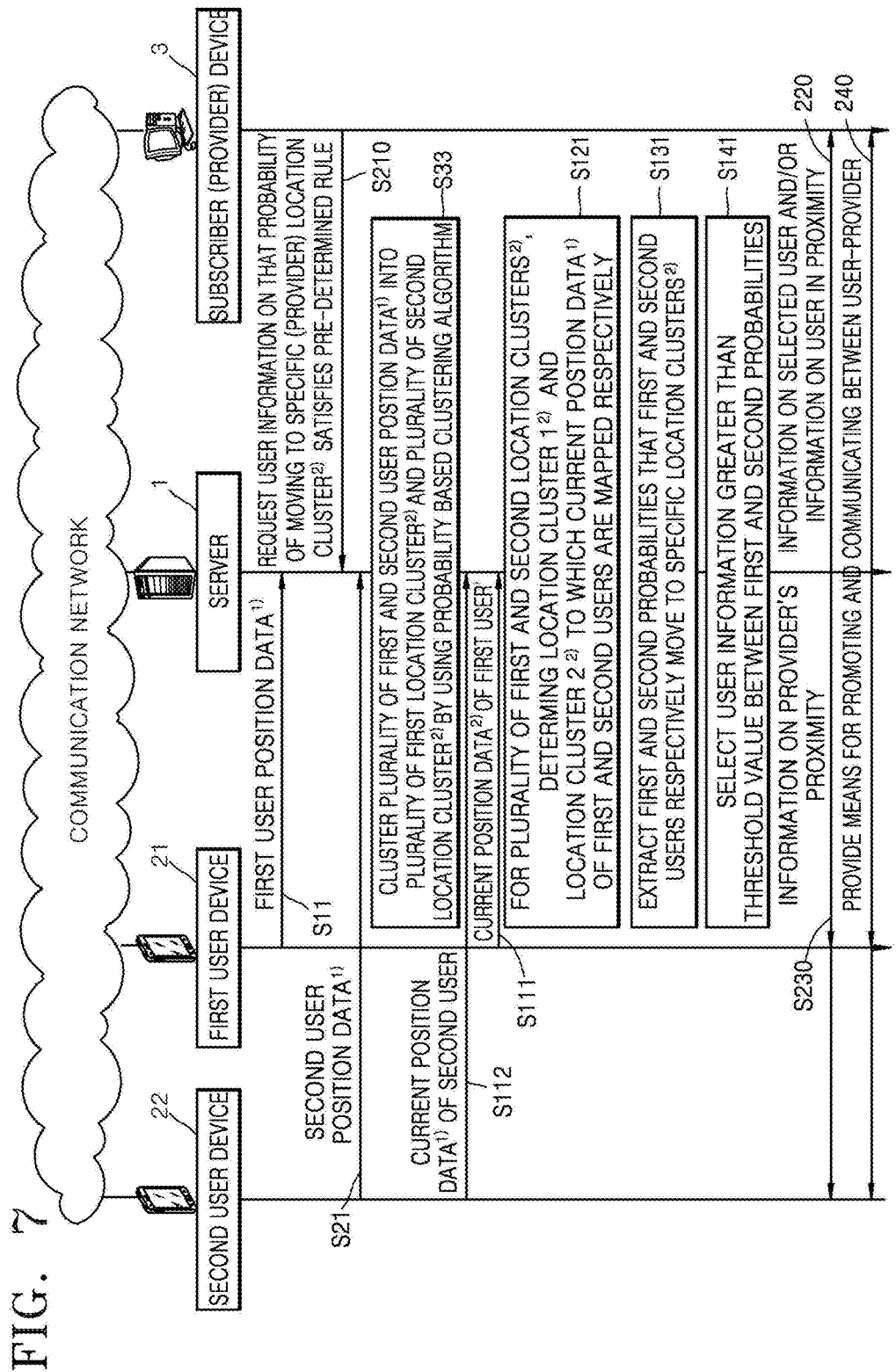
FIG. 7 is a view for explaining a method of processing user information according to another embodiment.

Hereinafter, a method of processing user information according to another embodiment is described with reference to FIG. 7. FIG. 7 is a view for explaining a user information processing method according to another embodiment of the present invention. This method may be executed in the subscriber device 3.

The user information processing method may include operation S210 requesting, from a server, identification information on the user whose probability of moving to a specific location cluster including a specific position designated by a person using the subscriber device 3 satisfies a pre-determined rule. Here, the specific position designated by the person using the subscriber device 3 may be, for example, a place where the business owner using the subscriber device 3 actually sells products or services. In addition, the specific location cluster may be, for example, any one of a plurality of pre-determined clustered location clusters as shown in FIG. 4. In other words, the plurality of location clusters may be, for example, cluster #1 to cluster #6 301 to 306 as shown in FIG. 5. In addition, a probability of moving to the specific location cluster may refer to, for example, a probability that the user moves to cluster #1 301 in FIG. 5. Here, although the specific position is designated by the person using the subscriber device 3, where and what the specific location cluster including the specific position is may be determined by the server 1.

Next, the user information processing method may include operation S220 of receiving the information (for example, user ID, or user device ID) on the user whose probability of moving to the specific location cluster satisfies the pre-determined rule from the server 1. Here, the pre-determined rule may be a rule that determines whether the probability of moving is greater than a specific value, but is not limited hereto and various rules may be adopted. In addition, a selected user may mean a user adjacent to a workplace of the business owner of the subscriber device 3.

At this point, in order to execute operation S220, the server 1 may perform one or more of the following operations shown in FIG. 7.

Firstly, the server 1 may perform operation S11 of receiving a plurality of first user position data collected from the first user staying or moving with the user device and operation S12 of receiving a plurality of second user position data collected from the second user. Next, the server 1 may perform operation S33 of clustering the plurality of first user position data into a plurality of first location clusters and create information on the plurality of first location clusters and clustering the plurality of second user position data into a plurality of second location clusters and create information on the plurality of second location clusters by using the probability based clustering algorithm described in Embodiment 1. Here, the information on the plurality of first location clusters and the information on the plurality of second location clusters may be a concept same as or a concept including the Markov chain as shown in FIG. 5. When the information on the plurality of first location clusters and the information on the plurality of second location clusters are previously provided, operations S11, S12 and S33 may be omitted. After operation S33, the operations S13 and S14 may be additionally performed.

Next, the server 1 may perform operation S111 of receiving a first user's current position and operation S112 of receiving a second user's current position. The user device transmitting the first user's current position in operation S111 and the user device transmitting the plurality of first user position data in operation S11 may be the same or different from each other. In addition, the user device transmitting the second user's current position in operation S112 and the user device transmitting the plurality of second user position data in operation S12 may be the same or different from each other. Regarding this is described in Embodiment 2.

Next, the server 1 may perform operation S131 of extracting a first probability for the first user and a second probability for the second user. At this point, the first probability is a probability that the first user moves (from a location cluster 1 where he/she currently stays) to a specific location cluster [1] including a specific position designated by the user of the subscriber device 3. Here, the specific location cluster [1] is a location cluster included in the plurality of first location clusters. The second probability is a probability that the second user moves (from a location cluster 1 where he/she currently stays) to a specific location cluster [2] including a specific position designated by the user of the subscriber device 3. Here, the specific location cluster [2] is a location cluster included in the plurality of first location clusters. The specific positions [1] and [2] correspond to specific location clusters including specific positions designated by the subscriber device 3.

Next, the server 1 performs operation S141 of determining whether the first and second probabilities satisfy a pre-determined rule, and selecting information on a user corresponding to the probability satisfying the rule. At this point, the pre-determined rule may be, for example, a rule allowing information of the user whose mobility probability is 0.5 or greater to be selected, but is not limited hereto.

In addition, in operation S230, information that the user device 2 will approach a provider after a predetermined time (provider proximity information) may be transmitted from the server 1 to the user device 2. Furthermore, together with or separately from operations S220 and S230, the server 1 may provide operation S240 of providing, by a provider of the subscriber device 3, a unit for promoting and performing communication to the users of the user devices 21 and 22.

In Embodiment 1 to 3, operations executed by the server 1 may be executed by the user device 2 from case to case.

Figure 8A:
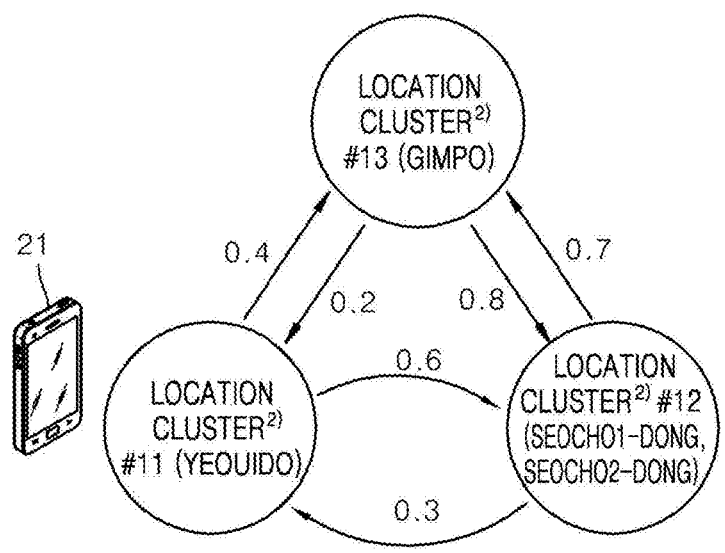
Figure 8B:
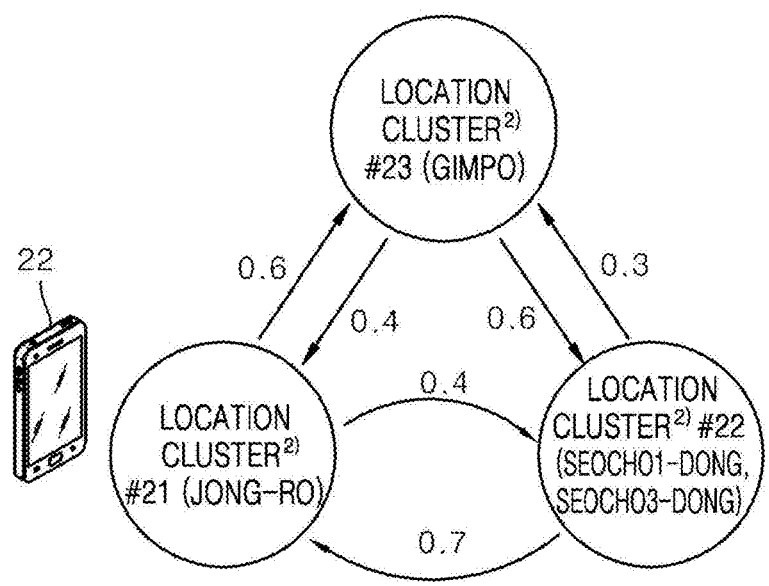

FIGS. 8A and 8B are views for explaining detailed examples of operations S11, S21, S33, S111, S113, S121, S131, S141, S210, and S220 described in relation to FIG. 7.

FIG. 8A represents information on the plurality of first position data obtained by using the probability based clustering algorithm from the plurality of first user position data obtained from the first user. In this example, cluster-areas where the user mainly stays are given as 3 and one or more location clusters different from the cluster-area may exist.

FIG. 8B represents information on the plurality of second position data obtained by using the probability based clustering algorithm from the plurality of second user position data obtained from the second user. In this example, cluster-areas where the user mainly stays are given as 3 and one or more location clusters different from the cluster-area may exist.

In examples shown in FIGS. 8A and 8B, a specific position designated by the subscriber device 3 is assumed to be Seocho1-dong. At this point, it is assumed that a first user's current position is location cluster #11 (Yeoeui-do) and a second user's current position is location cluster #21 (Jong-ro). At this point, the specific location cluster including Seocho1-dong, which is the specific position designated by the subscriber device 3, becomes location cluster #12 (Seocho1-dong, Seocho2-dong) for the first user, and location cluster #22 (Seocho1-dong, Seocho3-dong) for the second user. Thus the above-described first arbitrary location cluster becomes location cluster #12, and the second arbitrary location cluster becomes location cluster #22. At this point, a probability that the first user moves from location cluster #11 to location cluster #12 is 0.6, and a probability that the second user moves from location cluster #21 to location cluster #22 is 0.4. When the pre-determined rule is assumed to be a rule that allows only information on the user whose mobility probability is 0.5 or greater to be selected, only the information on the first user is selected and transmitted to the subscriber device 3. When a person using the subscriber device 3 is, for example, a business owner providing products or services and a workplace operated by the business owner is located in Seocho1-dong, the business owner receives the information on the first user who is likely to visit his/her own workplace in terms of geographical location and conducts individual marketing activity to the first user.

Description in relation to FIG. 7, it is described that the server 1 determines where and what the specific location cluster including the specific position is. For example, in FIG. 8, Seocho1-dong, which is the specific position, is designated by the person using the subscriber device 3, but the specific location cluster may be different for the first and second users. That is, for the first user, the specific location cluster including the specific position is location cluster #11, but for the second user, the specific location cluster is location cluster #21. In this way, it may be difficult for the subscriber device 3 and/or the person using the subscriber device 3 to designate or determine the specific location cluster.

<Embodiment 5>

Hereinafter, a user information processing method according to another embodiment of the present invention is described with reference to FIG. 9. FIG. 9 is a view for explaining a user information processing method according to another embodiment of the present invention. This method may be executed by the subscriber device 3. Embodiment 5 is a modified example of Embodiment 4, and a concept particularly not described here may be the same as that of Embodiment 4.

The user information processing method may include operation S310 of requesting, by the subscriber device 3 from the server 1, information on the probability of the user for moving to the specific location cluster including the specific position. At this point, the subscriber device 3 or the person using the subscriber device 3 may know in advance the information on the user. Here, the specific position may be designated by the person using the subscriber device 3, or be a fixed position or a position variable according to time. For example, the specific position may be a position where the business owner using the subscriber device 3 actually sells products or services. However, what the specific location cluster including the specific position means may be determined by the server 1.

Next, in the user information processing method, the subscriber 3 may receive information on a probability of the subscriber device 3 for moving to the specific location cluster from the server 1. This information on the probability may be a probability itself or processed information obtained by processing the probability. For example, the pre-determined rule may be a rule determining whether the mobility probability is greater than a specific value. In order to obtain the probability, the server 1 may perform the following operations.

Firstly, the server 1 may perform operation S11 of receiving a plurality of user position data collected from a user staying or moving with a user device. Next, the server 1 may perform operation S12 of clustering the plurality of user position data into a plurality of location clusters and create information on the plurality of location clusters by using the probability based clustering algorithm described in Embodiment 1. Here, the information on the plurality of location clusters may be the concept same as or the concept including the Markov chain as shown in FIG. 5. When the information on the plurality of location clusters is provided in advance, the operations S11 and S12 may be omitted.

Next, the server 1 may perform operation S110 of receiving a user's current position. The user device transmitting the user's current position in operation S110 and the user device transmitting the plurality of user position data in operation S11 may be the same as or different from each other. Regarding this is described in Embodiment 2.

Next, the server 1 may perform operation 120 of determining a first location cluster including the user's current position among a plurality of location clusters. Here, the plurality of predetermined location clusters may be generated in operation S12.

Next, the server 1 may perform operation S130 of extracting a probability for the user. At this point, the probability is a probability that the user moves (from a first location cluster where the user stays) to a specific location cluster including a specific position designated by the subscriber device 3. The specific location cluster is a location cluster included in a plurality of location clusters.

Next, operation S320 of transmitting, by the server 1, the information on the extracted probability to the subscriber device 3 may be performed. At this time, instead of transmitting the information on the extracted probability, information on the user's proximity that represents whether the user of the user device 2 approaches a provider of the subscriber device 3 on the basis of the extracted probability may be transmitted.

In addition, in operation 330, information that the user device 2 will approaches a provider after a predetermined time (provider proximity information) may be transmitted from the server 1 to the user device 2. Furthermore, together with or separately from operations S320 and S330, the server 1 may provide operation S340 of providing, by a provider of the subscriber device 3, a unit for promoting and performing communication to the user of the user device 2.

In Embodiment 1 to embodiment 4, operations executed by the server 1 may be executed in the user device 2 from case to case. In Embodiment 5, operations executed by the server 1 may also be executed by the user device 2.

Figure 10:
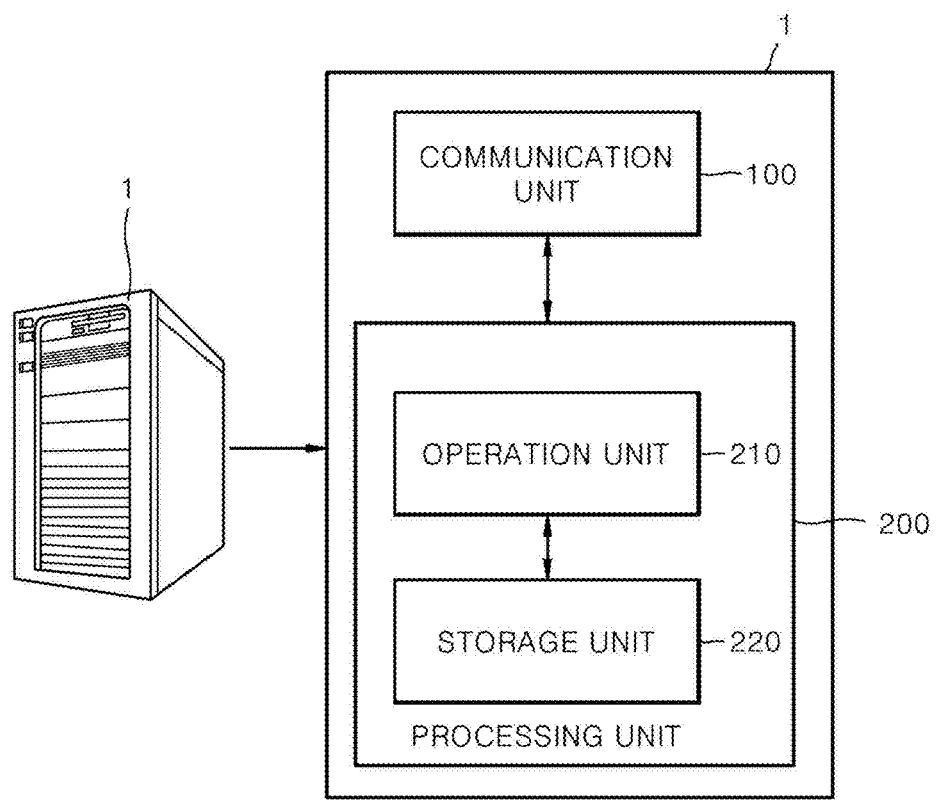
FIG. 10 shows an example of an internal structure of a server illustrated in FIG. 6A.

FIG. 10 illustrates a structure of a server available for an embodiment of the present invention.

Referring to FIG. 10, the server 1 may include a communication unit 100 and a processing unit 200 transmitting and receiving data and/or commands with the communication unit 100. The processing unit 200 may include operation unit 210 and a storage unit 220.

The processing unit 200 may calculate statistics about each group presented as an example in FIG. 3, create the Markov chain presented in FIG. 5, and execute operations S12, S120, and S130 in FIG. 6A, operations S33, S121, S131, and S141 in FIG. 7, and operations S11, S21, S112, S121, and S220 in FIG. 9. The communication unit 100 may execute operations S11, S110, and S140 in FIG. 6A, operations S11, S21, S112, S121, and S220 in FIG. 7, and operations S11, S110, and S320 in FIG. 9.

A concept of Markov chain used in an embodiment of the present invention is classified into a continuous time Markov chain and a discrete time Markov chain, and any one of both may be used. According to an embodiment, use of the continuous time Markov chain may be better.

<Extension of Big Data to a Pattern Extraction Method>

The 'position data' in above-described embodiments may be considered as an example of 'big data'. In an embodiment of the present invention, modeling may be conducted by clustering a portion of one set of big data or the entire one set of big data into a plurality of cluster-areas, representing the cluster-areas in mathematical states, and representing relationship between the cluster-areas in a probabilistic function. At this point, when the plurality of cluster-areas are created from the portion of one set of big data or the entire one set of big data, rest of data may be mapped to a different information area from the plurality of cluster-areas. The Markov chain model shown in FIG. 5 may be one type of such a model. The 'position information model' described in Embodiment 1 may be considered as an example of a 'data information model' created from big data according to an embodiment of the present invention, which is to be described below. At this point, the 'data information model' may be called as 'data pattern'. In addition, the 'location cluster' described in Embodiment 1 may be considered as an example of an 'information area' formed by clustering one set of big data. In such a way, a method according to an aspect of the present invention may be extended and applied to typical 'big data'. The 'mobility data' of a person and 'big data' include one or more attributes, because the one or more attributes commonly include time information.

In FIGS. 6A to 6C, 7, 8A, 8B, and 9, 'user position data' indicated with superscript 1) may extend the concept thereof to 'data of interest'. In addition, 'location cluster' indicated with superscript 2) may extend the concept thereof to 'information area'.

Hereinafter, a method of creating a data pattern of big data according to an embodiment of the present invention.

<Embodiment 6>

A method is provided which creates data-pattern of big data according to an embodiment of the present invention.

The method includes operation (s610) of receiving a plurality of 'data. (big data)' for 'target of interest target', and operation (S620) of creating data-pattern for a plurality of 'information areas' by processing the plurality of data with a 'probability based clustering algorithm'.

Here, for example, the target of interest may be a human, and the data may be position data. For another example, the target of interest may be a present condition of weather change, and data may be weather data. At this point, the weather data may include information such as time, wind speed, or wind direction. The above described position data and weather data have a common point of including information on time.

At this point, the information area may be a union of 'cluster-areas' corresponding to 'attribute of interest' and 'complementary set-areas' not belonging to the cluster-areas. When the data is assumed to weather data, the weather data may be assumed to include information such as atmospheric pressure, whether it rains, latitude, or longitude. At this point, for example, when the attribute of interest is defined as "latitude-longitude where it is raining and under low pressure", data having "latitude-longitude where it is raining and under low pressure" may be mapped to the cluster-area and data not having the attribute of interest may be mapped the complementary set-area.

According to this method, totally collected N data is clustered and M information areas may be created. At this point, any one data among N data may be mapped to any one of M information areas.

On the other hand, the creating operation S620 may include operation S621 of filtering error data among the data on the basis of the data attributes. For example, position data of a human is assumed to be used as the data. At this point, the position data includes time, latitude, longitude information, and velocity and acceleration of the human, who is a target of interest, may be calculated using the information. At this point, the acceleration of the human may be considered as 'attribute of data', and, when the acceleration of the human is very large, it is determined the data is erroneous. In such a way, error data among the data may be filtered on the basis of data attributes.

In addition, the creating operation S620 may further include operation S622 of dividing the plurality of data into a plurality of initial information areas, operation S623 of refining the initial information areas into a plurality of second information areas by using probability based clustering, operation S624 of extracting statistics of data belonging to each area of the plurality of second information areas, and operation S625 of representing relationship between the cluster-areas in a probabilistic function and representing the cluster-areas in a mathematical state. At this point, the mathematical state may mean the cluster-area, and the probabilistic function may represent 'relation-probability' between the cluster-areas.

For example, the Markov-chain may be created as shown in FIG. 5 by operation S625. At this point, the relation-probability may be defined as a probability of transitioning from a first state to a second state in the Markov chain.

An example of the probability based clustering algorithm may be a clustering scheme by the expectation-maximization.

In order to perform clustering according to the method, a pre-determined probabilistic function according to attributes of the data may be used as an equation. For example, when, like Embodiment 1, the target of interest is a human and the data is position data, modified exponential distribution of Equation 4 is used as a probabilistic function.

After the operation S620 (operations S621 to S625), operation 630 of receiving one or more new data for the target of interest, and operation S640 of refining information on the plurality of information areas by using the one or more data may be further performed.

When data-pattern for the plurality of information areas is created by Embodiment 6, new data may be mapped to a first area which is any one of the previously created plurality of information areas.

The method according to Embodiment 6 may be executed by a device such as a terminal or a server having a processing unit and a communication unit. The communication unit may obtain the new data from outside and the processing unit may perform the above-described operations by using data fetched from the communication unit.

In the above, a relation-probability of another state related to a specific state may be a fixed value or a function of time. For example, a relation between height and weight of a human may vary for a long time, but in a short period, they have fixed values. On the other hand, a position of a specific person varies along time in most cases.

That is, since state transition from a state of home to a state of being in an office during going to work is concentrated on a specific time, a relation-probability between home and office may have meaning by representing with a time function. For a similar example, for weather information, a relation-probability that atmospheric pressure in Cheongju city affects atmospheric pressure in Daejeon city within a several hours is a time function, and similarly, a transition-probability that dark cloud in Daejeon city affects a probability of precipitation in Cheongju city is also a time function. That is, considering a relation-probability between specific states as the time function may be a general methodology for accurately describing the transition-probability.

<Embodiment 7>

Hereinafter, a method of collecting big data information according to an embodiment the present invention.

The method includes operation S710 of requesting, from a server, information on a target of interest. At this point, the request is transmitted to the server only when a relation-probability that 'attribute of interest' of data of a target of interest is included in a 'category' of attribute of interest of a specific information area among the plurality of information areas satisfies a pre-determined rule. Since an arbitrary one information area is a set including one or more data, attribute of interest of data included in the arbitrary one information area does not have one value, but may have a value having a predetermined category.

For example, when the target of interest is a present condition of weather change, data is weather data including latitude, longitude, and atmospheric pressure information, the attribute of interest of the weather data may be defined as 'atmospheric pressure'. At this point, it is assumed that the plurality of information areas include information area A and information area B. At this point, information area A is an area including data having atmospheric pressure of 760 mmHg or lower as attribute of interest, and information area B is an area including atmospheric pressure of 760 mmHg or higher as attribute of interest. In this case, when it is assumed that current atmospheric pressure at a point having specific latitude and longitude is 765 mmHg, a relation-probability that the atmospheric pressure at the point is lowered to 760 mmHg or lower may be calculated. At this time, for example, the pre-determined rule may be defined as "satisfying that a relation-probability is greater than 0.5". In this example, operation S710 may be embodied as follows. That is, in operation S710, information (e.g., relation-probability (p)) on the target of interest (e.g., present condition of weather change) is requested from the server. At this point, the request is transmitted to the server only when a relation-probability (p) that attribute of interest (e.g., atmospheric pressure=765 mmHg) of data (e.g., latitude (x), longitude (y), atmospheric pressure (765 mmHg)) of the target of interest is to be included a category (e.g., atmospheric pressure<765 mmHg) of attribute of interest of a specific information area (e.g., information area A) among a plurality of information areas satisfies a pre-determined rule (e.g., p>0.5).

For another example, when the target of interest is a human, data is position data including latitude and longitude, operation S710 may be embodied as follows. That is, in operation S710, information (e.g., relation-probability (p)) on the target of interest (e.g., human) is requested from the server. At this point, the request is transmitted to the server only when a relation-probability (p) that attribute of interest (e.g., latitude=85°) of data of the target of interest is to be included in a category (e.g., 89°<latitude<90°) of attribute of interest of a specific information area (e.g., information area C) among a plurality of information areas (e.g., information area C (89°<latitude<90°) and information area D (84°<latitude<89°)) satisfies a pre-determined rule (e.g., p>0.5).

At this point, whether the relation-probability (p) satisfies the pre-determined rule may be determined by the server by executing a process including operation S711 of receiving information on current data of the target of interest, operation S712 of determining a first information area to which the current data is mapped among the plurality of information areas, and operation S713 of determining a relation probability that attribute of interest of data of the target of interest is to be included in a category of attribute of interest of the specific information area in a state of being included in a category of attribute of interest of the first information area satisfies the pre-determined rule.

For example, when a target of interest is present condition of weather change and data is the weather data, in operation S711, current data (e.g., latitude (x), longitude (y), atmospheric pressure 765 mmHg) of the target of interest is received. In operation S712, a first information area to which the current data is mapped among the plurality of information areas may be determined as the information area B (e.g., atmospheric pressure>760 mmHg). In operation S713, it may be determined that a relation-probability (p) that attribute of interest (e.g., atmospheric pressure) of the weather data of the target of interest is to belong to a category of attribute of interest (e.g., atmospheric pressure<760 mmHg) of a specific information area (e.g., information area A) satisfies the pre-determined rule (e.g., p>0.5).

For another example, when the target of interest is a human and data is position data, in operation S711, current data (e.g., latitude=85°, longitude=180°, time) of the target of interest is received. In operation S712, a first information area to which the current data is mapped among the plurality of information areas may be determined as the information area D (e.g., 84°<latitude<89°). Next, in operation S713, it may be determined that a relation-probability (p) that attribute of interest (e.g., latitude) of the position data of the target of interest is to belong to a category of attribute of interest (e.g., 89°<latitude<90°) of a specific information area (e.g., information area C) satisfies the pre-determined rule (e.g., p>0.5).

After operation S710 (namely, operations S711 to S713), operation S720 of receiving the information on the target of interest from the server may be performed.

21 Embodiment 8>

Hereinafter, a method of collecting information on a target of interest having big data according to an embodiment of the present invention is described.

The method includes operation S810 of requesting information on a relation-probability that attribute of interest of data for a target of interest is to be included in a category of attribute of interest of a specific information area belonging to a plurality of pre-determined information areas, and operation S820 of receiving the information on the relation-probability from the server. At this point, the relation-probability may be determined by the server that performs processes including operation S811 of determining a first information area to which current data of the target of interest is mapped among the plurality of information areas, and operation S812 of extracting information on a relation-probability that attribute of interest of data of the target of interest is to be included in a category of attribute of interest of the specific information area in a state of being included in a category of attribute of interest of the first information area.

For example, when the target of interest is a human, data is position data, in operation S810, information on a relation-probability (p) that attribute of interest (e.g., latitude) of data for a target of interest is to be included in a category (e.g., 89°<latitude<90°) of attribute of interest (e.g., latitude) of a specific information area (e.g., information area C) belonging to a plurality of pre-determined information areas (e.g., information area C, and information area D) is requested from the server. At this point, in operation S811, the server may determine the first information area to which current data (e.g., latitude=85°, longitude=180°, time) of the target of interest is mapped among the plurality of information areas as the information area D (e.g., 84°<latitude<89°). Next, in operation S812, a probability (e.g., p=0.01) that attribute of interest (e.g., latitude) of data of the target of interest is to be included in a category (e.g., 89°<latitude<90°) of attribute of interest of the specific information area (e.g., information area C) may be extracted in operation S820, information (e.g., p=0.01) on the relation-probability may be received from the server.

<Embodiment 9>

Hereinafter a method of providing information on a target of interest having big data according to an embodiment to of the present invention is described.

This method may include operation S910 of receiving current data of a target of interest and operation S920 of determining a first information area to which the current data is mapped among a plurality of pre-determined information areas, and operation S930 of providing information on a relation probability that attribute of interest of data of the target of interest is to be included in a category of attribute of interest of the second information area belonging to the plurality of location clusters in a state of being included in a category of attribute of interest of the first information area.

For example, when a target of interest is a human and data is position data, in operation S910, current data (e.g., latitude=85°, longitude=180°, time) of the target of interest may be received. Next, in operation S920, a first information area to which current data is mapped among a plurality of pre-determined information areas (e.g., information areas C and D) may be determined as information area D (e.g., 84°<latitude<89°). Next, in operation S930, information on a relation probability (p=0.01) that attribute of interest (e.g., latitude) of data of the target of interest is to be included in a category (e.g., 89°<latitude<90°) of attribute of interest of a second information area (e.g., information area C) may be provided.

Hereinafter, a user position prediction method according to an embodiment of the present invention is described with reference to FIGS. 6A and 7.

This prediction method may include an operation s11 of collecting a plurality of user's position data pertaining to the user of the user device 2, and operations S12 and S33 of processing the plurality of user position data with a probability based clustering algorithm and create information on a plurality of location clusters. The method further includes operations S120 and S121 of determining a first location cluster to which the current position data is mapped among the plurality of location clusters. Then, the method may further include operations S130, S131, and S141 of creating information related to a probability that the user of the user device 2 moves from the first location cluster to a second location cluster among the plurality of location clusters.

This prediction method may be performed by a server or device such as a user device, which includes a communication unit and processing unit, a computer readable medium having a program for executing this method recorded thereon may also be provided. A device and medium related to such a prediction method may be easily provided.

<Example of Processing Big Data Pertaining to Human Mobility>

Hereinafter, a result of clustering and processing big data pertaining to human mobility is exemplified.

Figure 11:
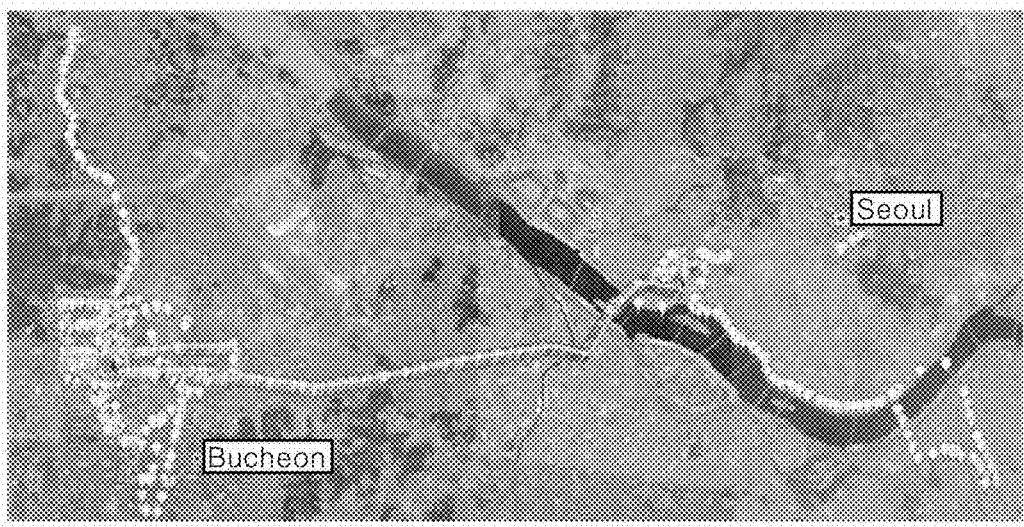
FIG. 11 shows an example that represents big data (position data for a first subject in Seoul) on a map, which is collected according to an embodiment of the present invention.
Figure 12:
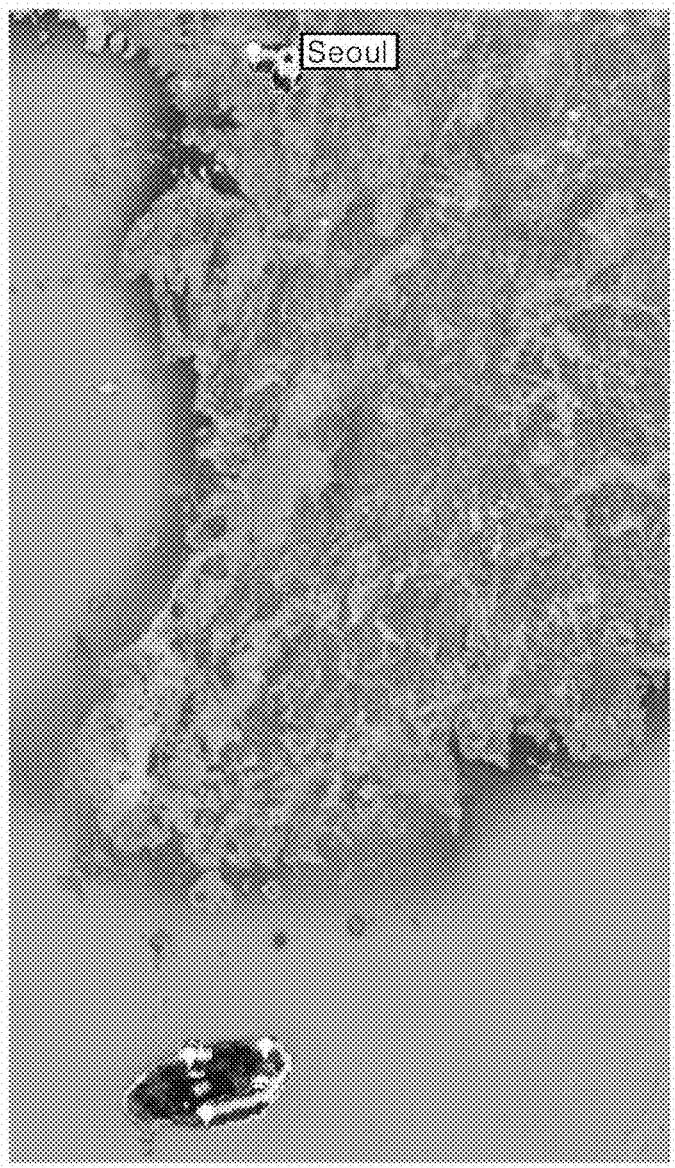
FIG. 12 shows an example that represents big data (position data for a second subject in Seoul and Jejudo) on a map, which is collected according to an embodiment of the present invention.

FIG. 11 illustrates an example of representing collected big data (position data of the first subject in Seoul) on a map according to an embodiment of the present invention. FIG. 12 shows another example that collected big data (position data of a second subject in Seoul and Jejudo) is represented on a map according to an embodiment of the present invention.

In FIGS. 11 and 12, only positions of the first and second subjects are represented on a map, and location clusters or information on cluster-area obtainable from the positions are not indicated thereon.

Figure 13:
FIG. 13 shows an example that represents on a map a portion of a result that big data in FIG. 11 is clustered.

FIG. 13 is an example of representing, on a map, a portion of a result that the big data presented in FIG. 11 is clustered. In FIG. 13, cluster-area#5 (Cluster 5) is formed near Gimpo, cluster-area#3 (Cluster 3) is formed near Bucheon, and cluster-area#2 (Cluster 2) is formed therebetween.

Figure 14:
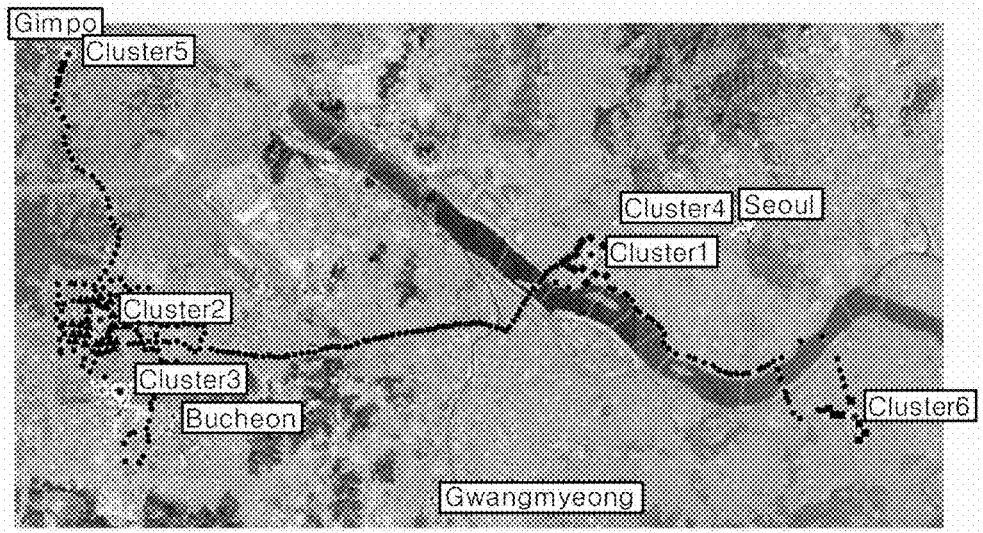
FIG. 14 shows another example that represents on a map a portion of a result that big data in FIG. 11 is clustered.

FIG. 14 is another example of representing, on a map, all results that the big data presented in FIG. 11 is clustered on a map. It may be confirmed that cluster-area#1 to #6 are formed.

Figure 15:
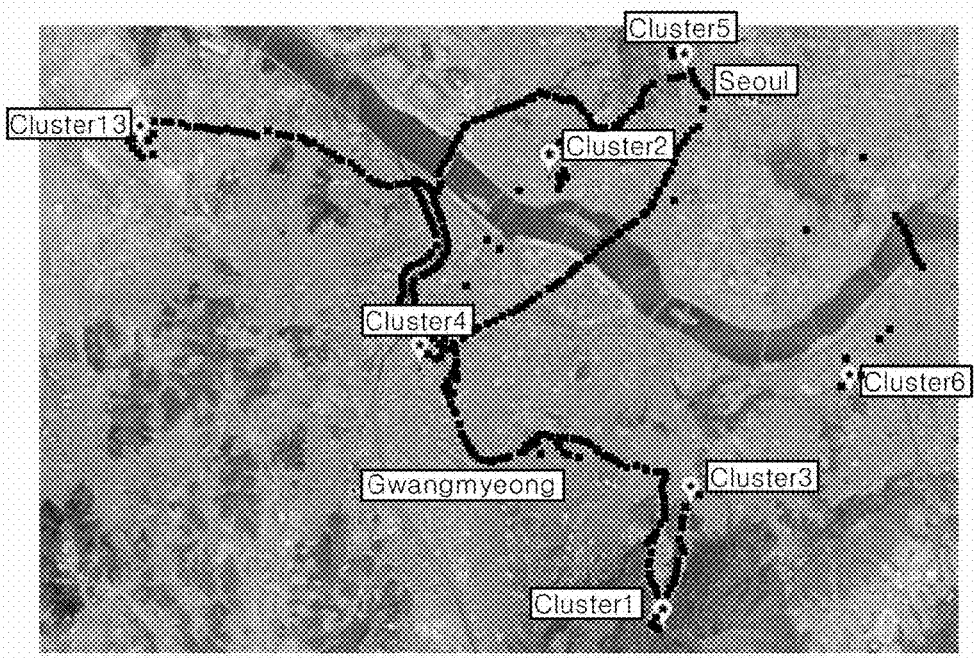
FIG. 15 shows an example that represents on a map a result in Seoul among results that big data in FIG. 12 is clustered.

FIG. 15 is an example of representing, on a map, a result in Seoul among a result that the big data presented in FIG. 12 is clustered. It may be confirmed that cluster-area#1 to #6 and #13 are formed.

Figure 16:
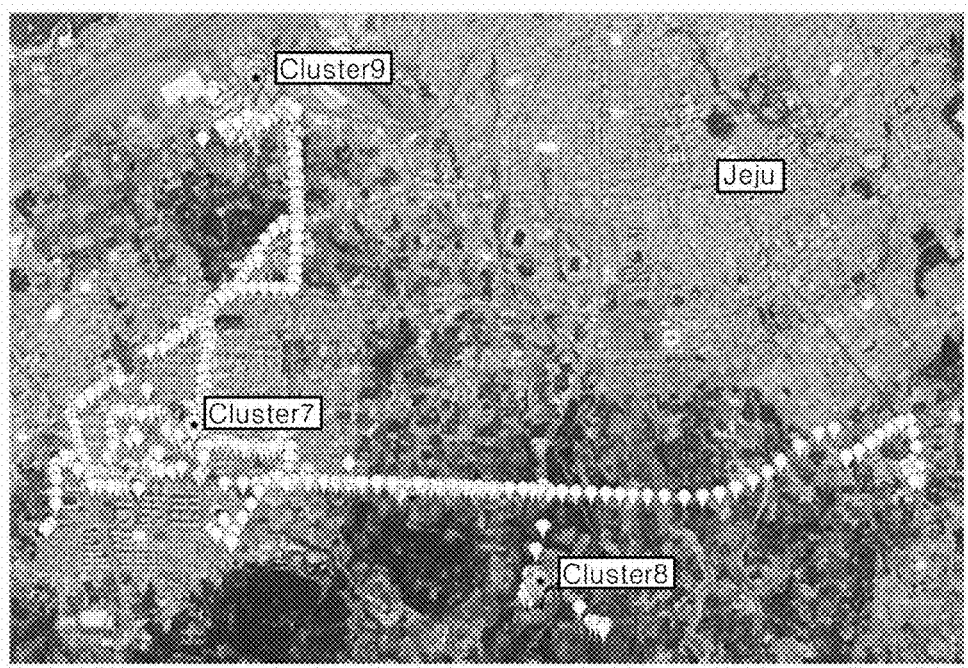
FIG. 16 shows an example that represents on a map a result in Jeju-do with Jeju city as the center among results that big data in FIG. 12 is clustered.

FIG. 16 is an example of representing, on a map, a result with Jeju city of Jeju-do as the center among the result that the big data presented in FIG. 12 is clustered. It may be confirmed that cluster-area#7 to #9 are formed.

Figure 17:
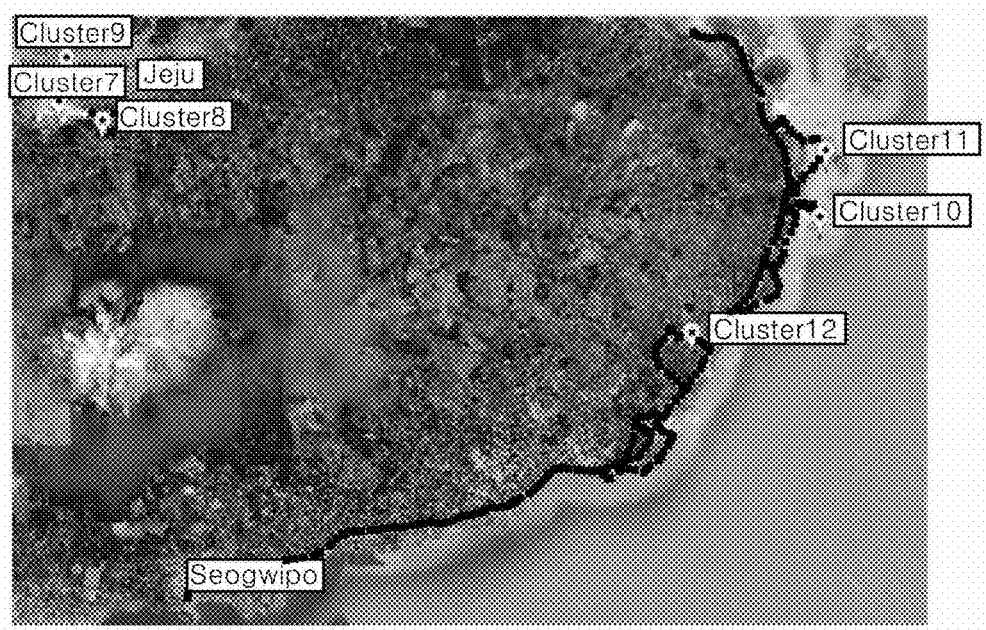
FIG. 17 shows an example that represents on a map a result in Jeju-do among results that big data in FIG. 12 is clustered.

FIG. 17 is an example of representing, on a map, a result of Jeju-do among the result that the big data presented in FIG. 12 is clustered. It may be confirmed that cluster-area#7 to #12 are formed.

Figure 18:
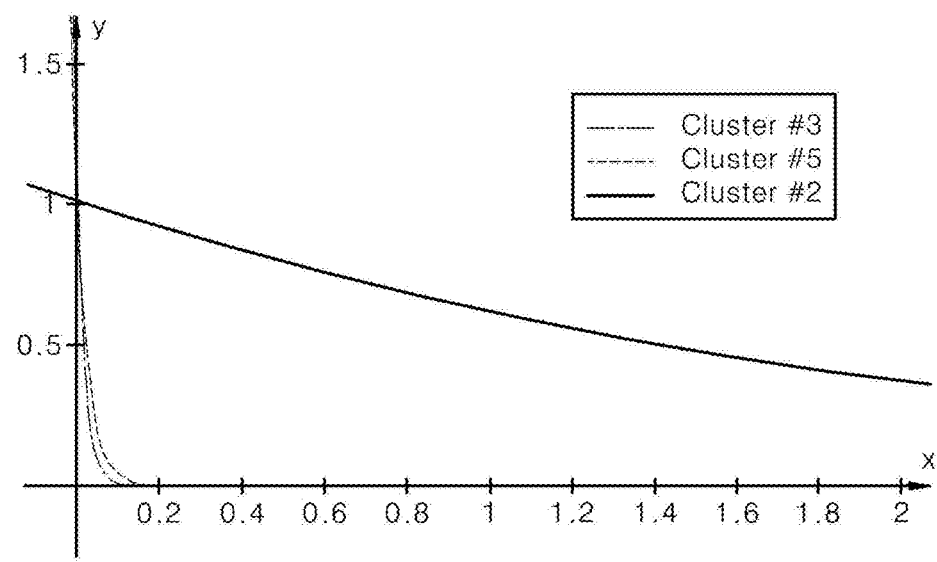
FIG. 18 shows an example of a probability density function used for clustering big data obtained from the first subject of FIG. 11.

FIG. 18 is an example of a probability distribution function used for clustering big data obtained from the first subject in FIG. 11. An x-axis of a graph shown in FIG. 18 denotes a distance from the center of a cluster, and a y-axis denotes a probability density. In this graph, a solid line, a long dotted line, and a short dotted line respectively represent probability density functions in cluster-area #2, #5, and #3 shown in FIG. 14. The probability density function in each cluster-area has a modified exponential distribution, and parameters are calculated by probability based clustering.

Figure 19:
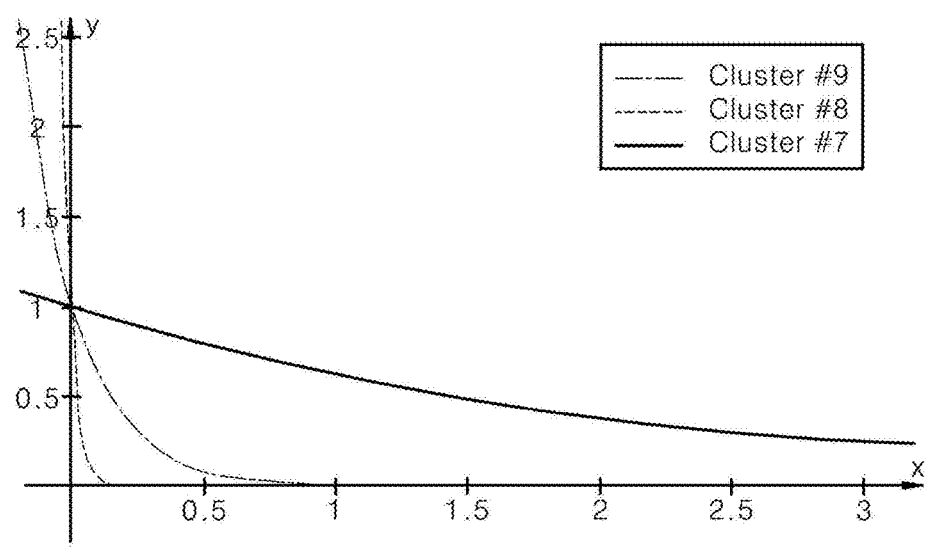
FIG. 19 shows an example of a probability density function used for clustering big data obtained from the second subject of FIG. 12.

FIG. 19 is an example of a probability density function used for clustering big data obtained from the second subject in FIG. 12. In this graph, a solid line, a long dotted line, and a short dotted line respectively represent probability density functions in cluster-area #7, #8, and #9 shown in FIG. 16.

Figure 20:
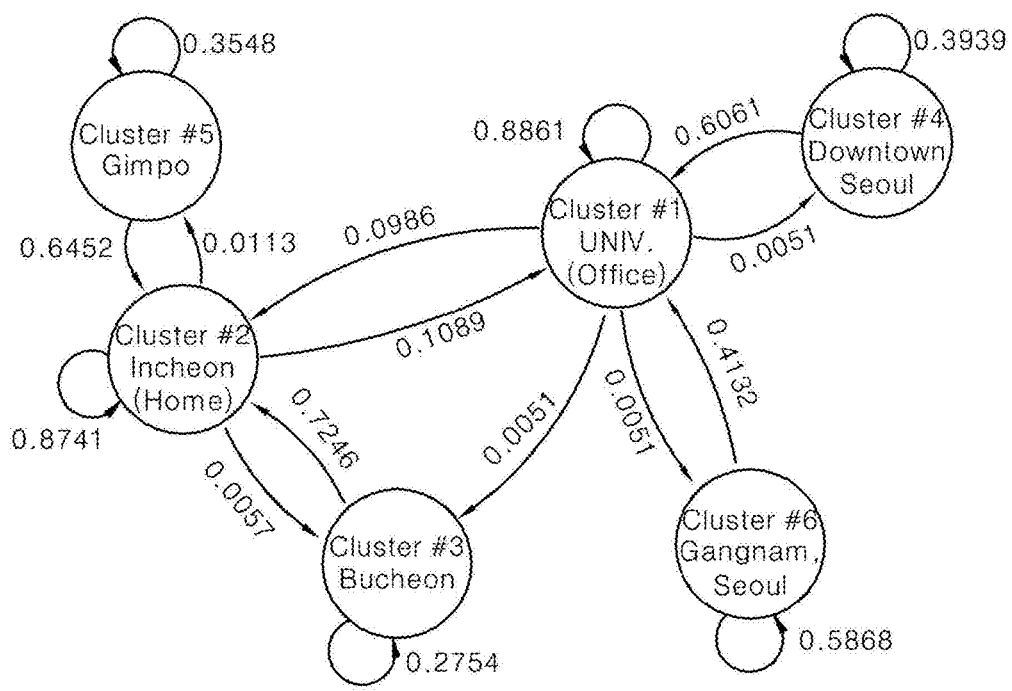
FIG. 20 shows a pattern extracted from big data which is obtained from the first subject of FIG. 11 and represented with CTMC.

FIG. 20 shows a pattern extracted from big data obtained from the first subject in FIG. 11 and represented with CTMC. In the drawing, transition probabilities between cluster-areas are shown together with 6 cluster-areas shown in FIG. 14. In addition, the CTMC is abbreviation for continuous time Markov chain and means one of schemes for providing a transition probability between description of a specific state and the state in a continuous time.

Figure 21A:
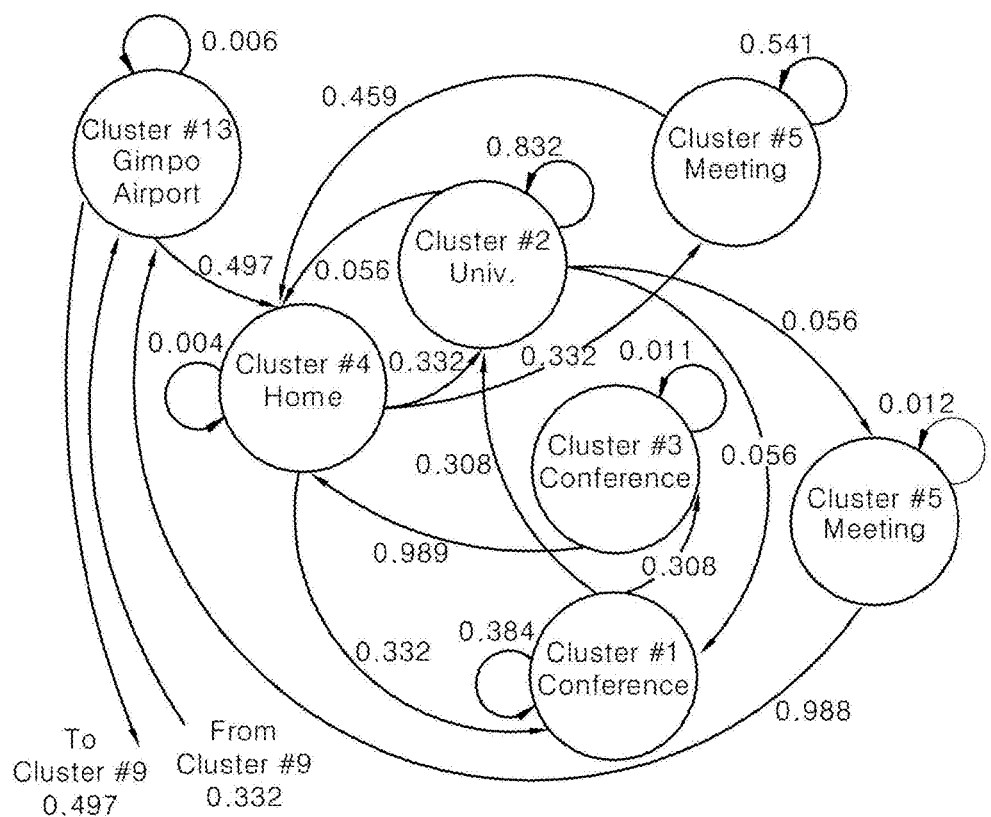
FIGS. 21A and 21B show patterns extracted from big data which is obtained from the second subject of FIG. 12 and represented with CTMC.
Figure 21B:
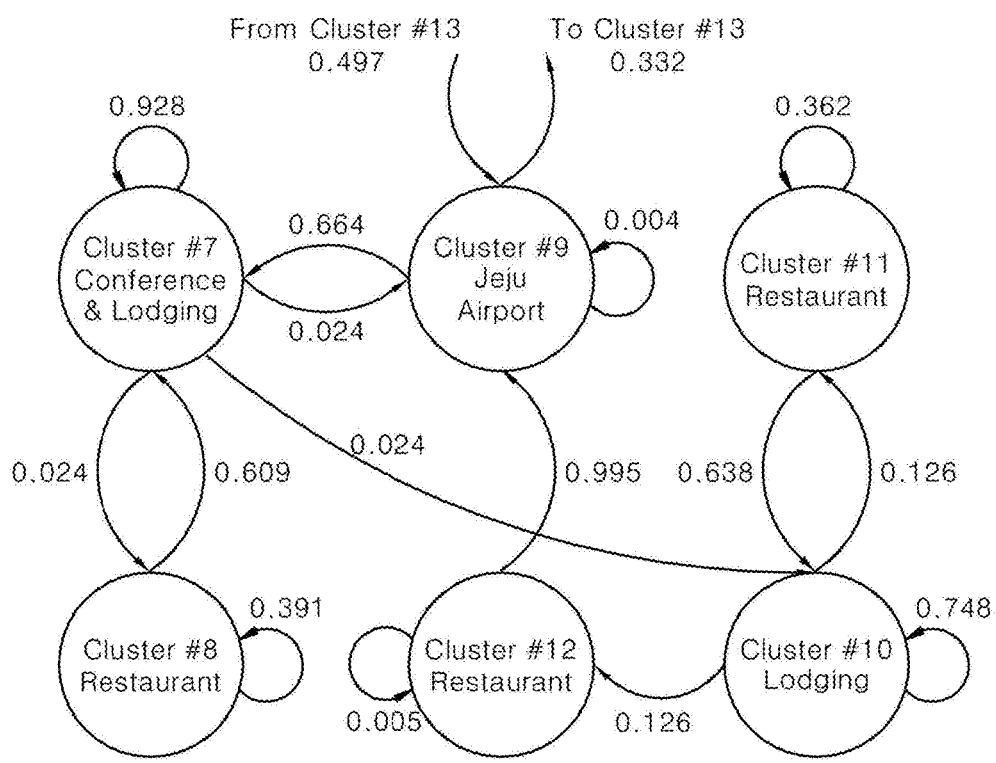

FIGS. 21A and 21B show a pattern extracted from big data obtained from the second subject in FIG. 12 and represented with CTMC. FIG. 21A represents a result in Seoul and FIG. 21B represents a result in Jejudo. A transition probability between Cluster-area#13 in FIG. 21A and cluster-area#9 in FIG. 21B is also represented.

FIG. 22 shows detailed information on 13 clusters created from big data obtained from the second subject in FIG. 12.

Although the present invention been described with reference to the specific embodiments, it is not limited thereto. Therefore, it will be readily understood by those skilled in the art that various modifications and changes can be made thereto without departing from the spirit and scope of the present invention defined by the appended claims.

The invention claimed is:

1. A method of predicting user's position, comprising:
creating, by a server, information on a plurality of location clusters by processing a plurality of position data for a user with a probability based clustering algorithm;
receiving, by a server, a current position data of the user and determining a first location cluster to which the current data is mapped among the plurality of location clusters; and
creating, by a server, second information related to a probability that the user moves from the first location cluster to a second location cluster among the plurality of location clusters,
wherein the position data is a data tuple including latitude, longitude, and time,
for all the plurality of location clusters, the information includes a determined representative position value of each of the location clusters,
the information on the plurality of location clusters is information given in a type of a Markov-chain,
each of the plurality of location clusters corresponds to a state of the Markov chain, and
a probability that the user moves from the first location cluster to the second location cluster represents a probability that a first state of the Markov chain, which corresponds to the first location cluster, is transitioned to a second state of the Markov chain, which corresponds to the second location cluster.

2. The method of claim 1, wherein the Markov-chain is built by using:
a step of dividing the plurality of position data into a plurality of initial clusters,
a step of refining the initial clusters to a plurality of second clusters having different boundary areas from the initial clusters,
a step of extracting position data statistics from each group of the second clusters, and
a step of building the Markov-chain by using the position data statistics.

3. The method of claim 1, wherein the information on the plurality of location clusters comprises information on mathematical states of the plurality of location clusters created by clustering the plurality of position data and information that relations between the location clusters are represented in a probabilistic function.

4. A user's position prediction apparatus comprising:
a processing unit; and
a communication unit,
wherein the processing unit,
receives a plurality of position data for a user through the communication unit and creates information on a plurality of location clusters by processing the plurality of position data for a user with a probability based clustering algorithm;
receives, through the communication unit, a current position data of the user and determines a first location cluster to which the current data is mapped among the plurality of location clusters;
creates second information related to a probability that the user moves from the first location cluster to a second location cluster among the plurality of location clusters,
wherein the position data is a data tuple including latitude, longitude, and time, and
for all the plurality of location clusters, the information includes a determined representative position value of each of the location clusters,
the information on the plurality of location clusters is information given in a Markov-chain type,
each of the plurality of location clusters corresponds to a state of the Markov chain, and
a probability that the user moves from the first location cluster to the second location cluster represents a probability that a first state of the Markov chain, which corresponds to the first location cluster, is transitioned to a second state of the Markov chain, which corresponds to the second location cluster.

5. A non-transitory computer readable medium having a program recorded thereon, which, when executed by a computer, performs:

creating information on a plurality of location clusters by processing a plurality of position data for a user with a probability based clustering algorithm;
receiving a current position data of the user and determining a first location cluster to which the current data is mapped among the plurality of location clusters; and
creating second information related to a probability that the user moves from the first location cluster to a second location cluster among the plurality of location clusters,
wherein the position data is a data tuple including latitude, longitude, and time,
for all the plurality of location clusters, the information includes a determined representative position value of each of the location clusters,
the information on the plurality of location clusters is information given in a Markov-chain type,
each of the plurality of location clusters corresponds to a state of the Markov chain, and
a probability that the user moves from the first location cluster to the second location cluster represents a probability that a first state of the Markov chain, which corresponds to the first location cluster, is transitioned to a second state of the Markov chain, which corresponds to the second location cluster.

* * * * *

UNITED STATES PATENT AND TRADEMARK OFFICE
CERTIFICATE OF CORRECTION

PATENT NO. : 9,846,736 B2
APPLICATION NO. : 14/369585
DATED : December 19, 2017
INVENTOR(S) : Ha Yoon Song It is certified that error appears in the above-identified patent and that said Letters Patent is hereby corrected as shown below:

Please correct (73) Assignees to read as follows:

(73) Assignees: SONG, HA YOON, Seoul (KR); HONGIK UNIVERSITY INDUSTRY-ACADEMIA COOPERATION FOUNDATION, Seoul (KR)

Signed and Sealed this
Twenty-fourth Day of April, 2018

Andrei Iancu
*Director of the United States Patent and Trademark Office*